United States Patent
Dasher et al.

(10) Patent No.: US 12,192,287 B2
(45) Date of Patent: Jan. 7, 2025

(54) SYSTEMS AND METHODS FOR SHARING CONTENT IN AN EXTENDED REALITY ENVIRONMENT

(71) Applicant: Adeia Guides Inc., San Jose, CA (US)

(72) Inventors: Charles Dasher, Lawrenceville, GA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 70 days.

(21) Appl. No.: 18/142,636

(22) Filed: May 3, 2023

(65) Prior Publication Data

US 2024/0372922 A1 Nov. 7, 2024

(51) Int. Cl.
*H04L 67/131* (2022.01)
*H04L 67/56* (2022.01)

(52) U.S. Cl.
CPC ............ *H04L 67/131* (2022.05); *H04L 67/56* (2022.05)

(58) Field of Classification Search
None
See application file for complete search history.

(56) References Cited

U.S. PATENT DOCUMENTS

| | | | |
|---|---|---|---|
| 2005/0078613 A1* | 4/2005 | Covell | H04L 65/1101 370/260 |
| 2024/0053869 A1* | 2/2024 | Kim | G06F 1/163 |
| 2024/0087220 A1* | 3/2024 | Lee | G06F 3/04815 |

\* cited by examiner

*Primary Examiner* — Angela Nguyen
(74) *Attorney, Agent, or Firm* — Haley Guiliano LLP

(57) ABSTRACT

Systems and methods are disclosed herein for establishing a communication path between devices that are virtually proximate in an XR environment. First and second user devices are connected to the same space in a virtual environment (VE). The first user device is externally connected to a media device. Device information about the media device is retrieved, and a virtual device for the media device is generated in the space. The virtual device is selected. A communication path between the first and second user devices is identified based on their respective connections to the same space. A virtual connection is generated based on the identified communication path for providing media content between the media device and the user devices.

20 Claims, 8 Drawing Sheets

SYSTEMS AND METHODS FOR SHARING CONTENT IN AN EXTENDED REALITY ENVIRONMENT

BACKGROUND

The present disclosure is generally directed to systems and methods for sharing content from a first device to other devices bridged via an extended reality (XR) environment.

SUMMARY

Extended reality (XR) environments are emerging as a new paradigm for socializing and interacting in personal and professional settings. As XR environments continue developing (e.g., in metaverse applications), scenarios may arise where users may request a virtual environment (VE) having experiences and interactions analogous to a realistic environment, such as being able to wirelessly link devices (e.g., connecting via Bluetooth).

A connection utilizing a radio frequency (RF)-based transmission (i.e., an RF-based connection) between devices cannot be established for user devices through a VE when the devices are not physically nearby (e.g., when the devices are in different geographical locations). For example, a user device may request to connect with a media device (e.g., a Bluetooth speaker, an Internet-of-Things (IoT) device, a smart hub, etc.) via an RF-based protocol or transmission medium (e.g., Bluetooth and its variants, a Wi-Fi network, Zigbee, Amazon Sidewalk, a cellular network, etc.). In some instances, the user device may store device information of the media device for subsequently generating the RF-based connection (e.g., pairing information). In such an approach, devices may be wirelessly connected if the devices are located within a physical proximity constrained by the RF-based connection (e.g., inside the same room or within a short range such as 30 feet).

As an illustrative example, connectivity under Bluetooth 5.0 may be limited to a physical range of about 100 feet under some circumstances due to the medium (e.g., air) of radio frequency (RF) transmission and/or various interferences (e.g., by a building wall). In this example, a first device (e.g., a hands-free audio player, a digital assistant, or a video display) designed to establish a communication path via Bluetooth could share the first device's functionality with a second device (e.g., a virtual reality (VR) or augmented reality (AR) headset) that is physically located within 100 feet of the first device but loses reliability outside this range. In this or other RF-based approaches, devices lack a way to establish a virtual connection when virtual representations of the devices are in the same VE since RF-based transmission is limited by a physical range.

In another approach, a mesh network may connect separate networks, for example, using an RF-based connection between outdoor access points (e.g., to connect neighboring buildings) and forward data based on the hardware address of the devices in the networks. An RF-based connection between access points is limited by the physical range of the RF transmission as in other approaches and can be subject to wireless interference. Further, in this approach and similar approaches that involve linking networks of devices, a communication path from a first device to a second device may include intervening nodes, checkpoints, routers, hubs, etc., which may contribute to latency and other connectivity characteristics that impact data transmission. The aforementioned issues may render such approaches unsuitable for XR systems and/other VE systems that rely on near real-time synchronization.

Thus, there is a need for connecting devices within a virtual proximity in an extended reality environment.

To overcome the aforementioned limits and unsatisfactory aspects of other approaches, systems and methods are presented for establishing a communication path between devices that are virtually proximate in an XR environment. One or more disclosed embodiments may enable sharing a connected media device (e.g., via an RF-based connection) through a communication path established in an XR environment. In some aspects, the present disclosure describes an XR framework that includes an XR environment system and/or an XR engine for generating and establishing a virtual network bridge configured to proxy device connections from a remote device and/or other devices linked to the remote device. In some aspects, one or more disclosed embodiments describe an XR framework including a network architecture that may spawn a programmable virtual network bridging a first device and one or more linked devices, where the XR system is configured to virtually pair devices using the virtual network. In some embodiments, the virtual network may be modeled based on a local network, and/or programmed to mimic the network functions, between devices at the same geographic location through virtualized components in the XR framework. In some aspects, the present disclosure describes an XR framework that generates a virtual application interface that enables an application at a device to communicate and interact with virtualized devices, or virtual devices, in a VE.

In some embodiments, an XR framework determines that a first user device and a second user device are connected to the same virtual space in a VE, wherein the first user device is paired and/or connected with a media device local to the first user device. Based on the pairing between the first user device and the media device, the XR framework may generate and/or present a virtual representation of the media device in the virtual space. The XR framework may receive a selection of the virtual representation of the media device, for example, from the second user device. The XR framework may generate a communication path that shares media content and/or device information between the media device, the first user device, and the second user device. In some embodiments, the XR framework may generate a virtual connection including a virtual bridge for sharing data between the media device, the first user device, and the second user device.

In some embodiments, an XR framework may determine that a first user device and a second user device are connected to the same virtual space in a VE, wherein the first user device is externally connected with a media device. The XR framework may retrieve device information corresponding to the media device. The XR framework may generate, based on the device information, a virtual representation of the media device in the same space. The XR framework may receive a selection of the virtual representation of the media device. The XR framework may identify a communication path between the first user device and the second user device based on the respective connections of the first user device and the second user device to the same virtual space. The XR framework may generate, based on identifying the communication path between the first user device and the second user device, a virtual connection for providing media content between the media device, the first user device, and the second user device.

In some embodiments, an XR framework may share content between virtually proximate devices using a virtual connection. As an example, a first XR device may be connected wirelessly (e.g., via Wi-Fi) to a smart TV display device displaying a movie. In this example, the XR framework may receive the movie and other associated data via the first XR device and generate a TV avatar in a VE representing the smart TV display device. The XR framework may generate the movie for display on the TV avatar and, in some instances, synchronize presentation of the movie on the TV avatar and at the smart TV display device. A second XR device may connect to the smart TV display device using a virtual connection. The second XR device, via an interactive virtual avatar, may interact with the TV avatar and view the movie at the TV avatar through the VE. In some embodiments, the second XR device is externally connected to a media device (e.g., via a local network). The second XR device may transmit the received movie for playing at the connected media device. In some embodiments, the XR framework extends a virtual connection to include the external connection between the second XR device and the second media device.

In some embodiments, the XR framework may generate a virtual bridge between a plurality of user devices for sharing content in a VE. For example, a plurality of user devices may receive music from a concert by having associated user avatars attend a virtual representation of the concert rendered in a VE through the XR framework. One or more user devices of the plurality of devices may be connected to a media device near to the one or more user devices. The XR framework may generate a virtual network that provides the music for playing at the nearby media device. In some instances, where each user device is connected to a respective media device, the XR framework, using the virtual network, may synchronize playing of the music at the respective media devices. In this manner, users may experience the virtual concert as a group, for example, through their user devices (AR/VR headsets, smartphones, etc.) supplemented by other devices (e.g., wireless speakers, displays, etc.) when the user devices are geographically remote and virtually proximate.

In some aspects described herein, an XR framework may enable a remote user device outside the physical range of RF-based connections to detect electronic devices in an advertising or discoverable mode (e.g., available for pairing). The advertising devices may be physically located and/or linked to a first user device via RF-based transmission (e.g., Bluetooth). For example, the first user device may open an external connection with a Bluetooth speaker for pairing with a second user device that is outside the Bluetooth speaker's connectivity range. The Bluetooth speaker, via the first user device, may provide music or other audio content when both the first and second user devices are virtually proximate (e.g., within an XR environment or other virtual space). At the second user device, the Bluetooth speaker may be shown as discoverable in a user interface for connecting to discoverable devices including RF-based connections. Additionally, or alternatively, the user interface may include a section for connecting to devices through a virtual connection.

As a result of the described systems and techniques, devices within a virtual proximity in an extended reality environment may be interconnected for sharing device functionality and/or content, improving on other approaches or lack thereof. For example, virtually proximate user devices may connect and share physical devices through the XR environment (e.g., in metaverse-based applications). For example, users at different geographic locations may share RF-based devices with an interactive environment through the XR framework that is missing in other approaches. Additionally, as a result of the described systems and techniques, the XR framework may improve system resource usage (e.g., computing cycles, memory allocation, traffic networking, etc.) by establishing an efficient communication path (e.g., a virtual bridge) having fewer intervening nodes and lower latency, among other benefits, between virtually paired devices. For example, the XR framework may generate multicast protocols directing traffic from a media device to a plurality of user devices connected via a virtual bridge. For example, the XR framework may determine an optimal communication path (e.g., shorter, faster, more reliable, more stable, etc.) between devices as part of the virtual connection. Thus, the XR framework of the present disclosure addresses the aforementioned issues and other unsatisfactory aspects.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
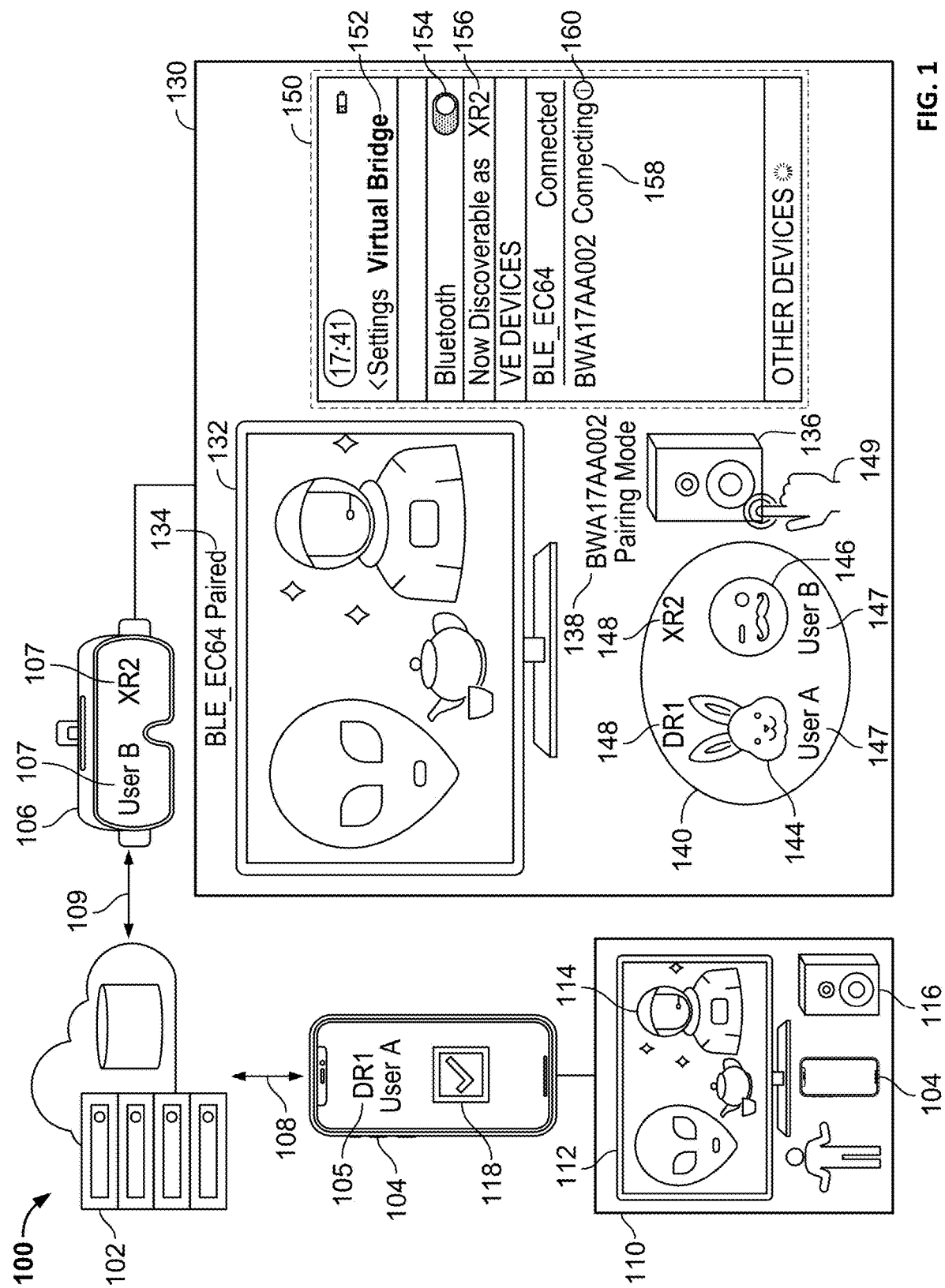
FIG. 1 shows an example scenario of an XR framework bridging virtually proximate devices, in accordance with some embodiments of this disclosure.

Systems and methods are described herein for an XR framework connecting devices within a virtual proximity in an extended reality environment.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, haptic feedback, information about content, images, animations, documents, playlists, websites and webpages, articles, books, electronic books, blogs, chat sessions, social media, software applications, games, virtual reality media, augmented reality media, and/or any other media or multimedia and/or any combination thereof. Extended reality (XR) content refers to augmented reality (AR) content, virtual reality (VR) content, hybrid or mixed reality (MR) content, and/or other digital content combined therewith to mirror physical-world objects, including interactions with such content.

As described herein, the term "virtual environment" and its variants refer to an artificial, interactive, digitally generated scene or world and include immersive media and/or 4D content. As described herein, the term "virtual space" and its variants refer to a space having defined bounds in a VE and within which models, avatars, and/or other virtual representations of physical objects (e.g., a digital twin) may engage, communicate, and interact, among other activities. As described herein, the term "virtual proximity" and its variants refer to digital models and/or other such representations being perceived as close to one another in the VE, including, but not limited to, a proximity threshold, virtual contact, collision detection, the models' position in a virtual space, the models' coordinates in a virtual space, and/or an information exchange that establishes protocols for a communication link. As described herein, the terms "virtual bridge" or "virtual device bridge" refer to a virtualized networking component (e.g., network bridge device) that joins two or more communication paths and/or forms a virtual network, which communicatively couples the devices in the virtual network. A communication path including a virtual bridge may be referred to as a virtual connection. As described herein, the term "external link" and its variants refer to a communication path, including wired and RF-based connections, between devices that are within a connectivity suitable for such connections (e.g., physically proximate) without coupling devices using a virtual bridge via an XR framework.

As described herein, an XR framework may include hardware, software, firmware, and/or any combinations of components thereof, where any of the involved systems may perform one or more of actions of the described techniques without departing from the teachings of the present disclosure. It is noted and appreciated that reference to an XR framework is provided for conciseness and may refer to one or more parts of the XR framework, and combinations thereof, that performs the described actions. Some non-limiting examples are described as follows. For example, an XR framework may include a locally hosted application at a user device. For example, an XR framework may include a virtual network between various devices. For example, an XR framework may include a remote application such as an XR environment system hosted at a server communicatively coupled to one or more user devices and other systems linked to a user device, where the XR environment system provides instructions that are transmitted to the user devices and executed by the relevant systems at the location of the user devices. For example, an XR framework may include a subsystem integrated with user equipment. For example, an XR framework may include a local application hosted at user equipment and a remote system communicatively coupled therewith.

Although described in the context of XR content and devices herein, it is noted and appreciated that the systems and techniques described herein are intended to be non-limiting and may be applicable within other contexts. For example, a virtual environment may include other digitally generated settings (e.g., a world in a gaming application). For example, an XR framework may include servers and applications for rendering various virtual environments. For example, virtual representations may include user avatars that are generated and/or projected for a physical location (e.g., for viewing a physical sporting event). For example, participants using a videoconferencing or teleconferencing application may be virtually proximate by attending the same videoconference or accessing the same breakout session within the videoconference. The participants may establish a virtual connection via their devices (e.g., a personal computer, a conferencing system hub, etc.). A virtual connection may be applicable for various situations, including MR scenarios. The examples described herein are illustrative, and the described techniques may be extended to include the various situations.

FIG. 1 shows an example scenario 100 of an XR framework 102 bridging virtually proximate devices 104 and 106, in accordance with some embodiments of this disclosure. In scenario 100, the XR framework 102 may be communicatively coupled to the devices 104 and 106 via communication paths 108 and 109, respectively. It is noted that paths 108, 109 may include a plurality of paths, networks, intervening nodes, edge servers, etc. Paths 108, 109 are described as single paths for conciseness, which is intended to be non-limiting and may include various configurations for paths 108, 109 as described in the following paragraphs with respect to FIG. 1. As described herein, the XR framework 102 may establish a communication path between devices (e.g., a virtual connection), which can include portions of paths 108, 109. The devices 104 (labeled DR1) and 106 (labeled XR2) may be associated with user and/or device identifiers 105 and 107, respectively.

The XR framework 102 may generate a virtual environment 130 including various virtual objects such as models 132, 136 corresponding to externally linked media devices 112, 116. The first user device 104 may be associated with a first user profile (labeled User A) and an avatar 144 in the VE 130. The second user device 106 may be associated with a second user profile (labeled User B) and an avatar 146 in the VE 130. The avatars 144, 146 may be in the same virtual space 140 in the VE 130. For example, the avatars 144, 146 may digitally represent respective users of the devices 104, 106 based on information from the respective user profiles. In some embodiments, the XR framework 102 may generate a virtual space 140 including virtual representations associated with user devices 104, 106 and/or associated with respective user profiles. For example, the avatars 144 and 146 in the VE 130 may be respectively associated with the devices 104 and 106. For example, the avatars 144 and 146 may be associated with user profiles (e.g., respectively labeled User A and User B). Actions of the avatars 144, 146 in the VE 130 may be controlled via the user devices 104, 106 (e.g., via a gaming control device externally linked to the device 106). Indicators 147, 148 may be displayed in the VE 130 and indicate the corresponding user/device identifiers 105, 107 for the avatars 144, 146. For example, the devices 104 and 106, via their respective display screens, may show viewpoints as presented in the VE 130 in the scenario 100. For example, each of devices 104 and 106 may display a respective viewpoint of the VE 130 as viewed from the respective avatar 144 or 146. In some embodiments, the XR framework 102 may generate the viewpoints and transmit the corresponding graphical data to be presented at respective displays of the devices 104 and 106. In some embodiments, the devices 104, 106 generate the avatars 144, 146 and their respective viewpoints, and the XR framework 102 generates the virtual objects in VE 130. The XR framework 102 may transmit relevant point-of-view (POV) information for the devices 104, 106 to update the respective viewpoints of the avatars 144, 146.

In some embodiments, the XR framework 102 may include an XR environment system for generating the VE 130 and XR content in the VE 130. For example, the XR framework 102 may include an XR engine that generates the VE 130 and representations for various digital assets of the VE 130. In some embodiments, the XR framework 102 is communicatively coupled to an XR environment engine. The XR framework 102 may provide instructions to the XR environment engine, based on activities/events in the VE 130, that cause the XR environment engine to perform some or all of the actions to generate, update, and maintain the VE (e.g., 3D modeling, asset processing, graphics processing, environment updating, etc.). The XR framework 102 may present the VE 130, or frames thereof, at devices 104 and/or 106. The example configurations of the XR framework 102 and paths 108, 109 described herein are intended to be illustrative and non-limiting. It is contemplated that an XR framework and the communication paths may have various configurations and/or combinations of hardware, software, firmware, etc., suitable for performing the functions described herein without departing from the teachings of the present disclosure.

The device 106 may be outside the connectivity range for devices 112 and 116. For example, the device 106 may be geographically remote from the physical location 110. For example, the device 104 may be located in Vancouver and the device 106 may be located in Chicago. The device 106 may be associated with device/user identifier 107. In the scenario 100, the device 106 may be an XR head-mounted device (HMD) or other wearable device for interacting with an XR environment such as the VE 130. In some instances, the VE 130 may be modeled based on a physical location or setting (e.g., a café, a concert venue, location 110, an arena, a sport venue, etc.). In some instances, the VE 130 may be modeled based on a fictional location or setting (e.g., a sci-fi environment, a historical setting, a futuristic setting, a fantasy world, an imaginary landscape, etc.).

The XR framework 102 may generate a virtual user interface (UI) 150 including UI elements 152-160. For example, the virtual UI 150 may include a UI identifier 152 (e.g., a title "Virtual Bridge"), an interactive icon 154 (e.g., button, toggle, switch, etc.), and a device status indicator 156. The virtual UI 150 may include a list of available devices in the VE 130 (labeled VE devices). In some embodiments, the virtual UI 150 may include a list of externally linked devices for the device 106 (e.g., labeled other devices). For example, the list may include a device connectivity status indicator 158 and an interactive icon 160 for accessing supplemental information of an available device (e.g., for additional device and/or connection information). For example, the virtual UI 150 may be displayed in the VE 130 for the device 106. The virtual UI 150 may be presented as an overlay (e.g., a floating screen) from the viewpoint of the device 106 in the VE 130.

Referring to scenario 100, the device 104 may be located in a physical location 110. The location 110 may include media devices 112 and 116. As an illustrative example, the location 110 may be a household with device 112 being a smart TV and device 116 being a wireless audio output system (e.g., including one or more wireless speakers). In this example, device 112 may be currently displaying video/audio content 114. Devices 112 and 116 may be paired and/or connected to device 104 in the location 110 (e.g., via Bluetooth, Wi-Fi, etc.). As described herein, devices 112 and 116 are externally linked to device 104. Device 104 may be associated with a device/user identifier 105. Device 104 may have an interactive UI element or option 118 to enable a sharing or discovery mode of one or more externally linked devices. For example, a user via the device 104 may turn on sharing for a paired device (e.g., device 116), which enables one or more user devices, having avatars within a configurable virtual proximity to the avatar 144 in the VE 130, to see advertisement packets from the paired device.

In the scenario 100, the first user device 104 may be externally linked to the devices 112, 116. The first user device 104 may enable a discovery mode for one or more externally linked devices through selection of option 118. The XR framework 102 detects that device 116 is discoverable via path 108 and the first user device 104. For example, the device 116, when discoverable, may broadcast, or allow access/retrieval of, connection and device information (e.g., Internet Protocol (IP) address, public authentication data, public access key, pairing information, etc.). The XR framework 102 may access/retrieve the relevant information for connecting to the device 116 via path 108 and the first user device 104. Based on the device 116 being discoverable, the XR framework 102 may generate the model 136 as an interactive element in the VE 130.

Continuing the scenario 100, the XR framework 102 determines that the devices 104 and 106 are virtually proximate. For example, the devices 104 and 106 may be within a virtual proximity based on the VE 130. For example, in the scenario 100, the avatars 144, 146 may access the same virtual space 140. Additionally, or alternatively, the avatars 144, 146 may exchange a virtual handshake or other interaction in the VE 130 that establishes protocols and/or acceptance of a communication link between the devices 104, 106. For example, the devices may exchange connection information including transfer rate, coding alphabet, parity, interrupt procedure, various security measures, etc. For example, the devices may exchange protocol data for initiating a communication in the VE. In some instances, exchanging the protocol data may include exchanging user identifiers. For example, if the virtual space 140 is a virtual social space (e.g., a social media platform), the devices may exchange usernames, enabling social communication between the avatars in the VE 130 (e.g., a friend request), which may be indicative of the devices being virtually proximate. Based on the virtual proximity status of the devices 104, 106, the XR framework 102 may generate a notification for the device 106 that indicates device 116 is available. In some embodiments, the XR framework 102 may broadcast, or allow access/retrieval of, the connection and device information for device 116 based on virtual proximity to the avatar 144 in the VE 130. For example, the XR framework 102 may determine an area around the avatar 144 as a virtual proximate area. For example, the XR framework 102 may determine a perimeter around the avatar 144 as a proximity threshold by defining a range based on distance from avatar 144 in the VE 130. In some embodiments, the XR framework 102 may determine that the device 106 is in discovery mode, for example, based on the mode toggled on via icon 154. The XR framework 102 may update the status indicator 156 and broadcast an availability status for the device 106 on one or more connections and/or based on a virtual proximity range from the avatar 146.

In some embodiments, the XR framework 102 may generate virtual representations corresponding to various physical devices for display in the VE 130. For example, the XR framework 102 may generate, based on the external connection of devices 112 and 116 to device 104, a virtual model 132 to represent the device 112 and a virtual model 136 to represent the device 116. For example, the XR framework 102 may access device information for the device 112 via the device 104. Examples of device information may include device make, device model, serial number, media access control (MAC) address, IP address, geolocation data, advertising ID, available applications, software version, firmware version, operating system information, etc. In this example, the XR framework 102 may determine a virtual representation of the device 112, for example, by accessing a database comprising a plurality of devices and associated information and identifying specifications (e.g., dimensions, size, weight, screen size, etc.) for the device 112 based on the device information such as the make, model, and serial number. The XR framework 102 may generate a model 132 of the device 112 from the specifications and position the model 132 in the VE 130. For example, the model 132 may be placed at a position relative to the position of device 112 at location 110. In a similar manner, the XR framework 102 may generate the model 136 for device 116. The virtual models 132, 136 may include display of respective indicators 134, 138 (e.g., device IDs). Indicators 134, 138 may be indicative of a device status, for example, by including a status label. Examples of a device status include active, inactive, sleep mode, offline, paired, pairing mode, connected, discoverable, etc. Indicators 134, 138 may include icons or other graphical elements (e.g., a green/red light, an animation, a spinning circle, etc.).

Referring to the scenario 100, the device 112 may be displaying content 114 comprising video and/or audio content. The XR framework 102, via the path 108 and the device 104, may determine that the device 112 is displaying content 114 and establish a virtual connection, including a virtual bridge, for receiving the content 114. For example, the virtual bridge may couple the XR framework 102 and the device 112. The XR framework 102 may identify a communication path between the first and second user devices based on their respective connections to the XR framework 102 (e.g., to the same virtual space hosted in the XR framework 102). In some embodiments, the XR framework 102 may perform one or more path optimization techniques and generate an optimized virtual connection between virtually proximate devices. For example, the device 112 may transmit content 114 to the device 104 via the corresponding external link, and the device 104 may transmit the content 114 to the XR framework 102 via a virtual connection. For example, the XR framework 102 may generate an optimized communication path bridging the device 112 and the XR framework. The optimized communication path may include path 108 or parts thereof. The XR framework may receive the content 114 via a virtual connection and present the content 114 to the VE 130 using the model 132.

A second user device (e.g., device 106) may view and/or interact with the content 114 in the VE 130 using the avatar 146 to control the model 132 in various ways (not shown in the scenario 100). Some interactions between avatar 146 and model 132 include the following illustrative, non-limiting examples. For example, the avatar 146 may select an option from a virtual UI that corresponds to the model 132. For example, the avatar 146 may tap a part of the model 132 that is assigned as a control interface in the VE 130. For example, the avatar 146 may speak a voice command received at the device 106 (e.g., from a user at the device 106). Based on the received input (e.g., interaction, selection, voice command, etc.), the XR framework 102 may modify the content 114 at the model 132 (e.g., pausing the content 114). For example, the avatar 146 may reduce the volume or select one or more trick-play functions for the content 114 at the VE 130 by sending commands through the model 132. In some embodiments, the XR framework 102 may transmit an instruction, via the virtual connection, that is configured to modify the presentation of content 114 (e.g., play back, audio/video settings, etc.) at the device 112 based on the interactions with the model 132 and/or commands received in the VE 130. Some example operations include pause, play, fast-forward, rewind, slow-motion, other trick-play operations, record, adjust volume and/or other audio settings, etc. For example, the XR framework 102 may synchronize the presentation of content 114 at the device 112 and the model 132 via the virtual connection. For example, the XR framework 102 may transmit an instruction that is configured to cause reduction of the volume or execution of a trick-play function at the device 112 based on a voice command from the avatar 146. For example, the XR framework 102 may receive a selected option that pauses presentation of the content 114 from the device 106. The XR framework 102 may transmit an instruction that pauses presentation of the content 114 at both device 112 and at the model 132. For example, the XR framework 102, based on receiving a selection of another option, may cause the presentation of the content 114 at device 112 to be paused and the content to play in slow motion and/or to record at the model 132. It is contemplated that the interactions between the virtually proximate devices have various configurations enabled via a virtual connection through the XR framework, including the aforementioned example operations.

The device 106 may request a connection to device 116 via the VE 130. In some embodiments, the avatar 146 may select or otherwise interact (e.g., via interaction 149) with the model 136 to request the connection between the devices 106 and 116. In some embodiments, the XR framework 102 may generate, modify, and/or update one or more elements of the virtual UI 150 for receiving a selection at the device 106. For example, in response to determining that the devices 104 and 106 are virtually proximate, the XR framework may add the device indicator 138 to a list of discoverable devices in the virtual UI 150. A corresponding status indicator 158 may be updated to notify that the device 116 is available. An interactive icon 160 may be included for accessing supplemental information about device 116 (e.g., the connection details, IP address, etc.).

As an illustrative example, one or more participants of a videoconference may establish a virtual connection between their respective devices that are accessing the videoconference session. A presentation device may be accessible to the participants via the virtual connection. The presentation device, via the virtual connection, may share a slideshow display or other visual content between the videoconference participants. The XR framework 102 may generate an interactive icon or a virtual model of the presentation device for shared display. One or more participant devices may select the icon or model to establish the virtual connection. The presentation device and/or virtual model may be configured to enable a participant device to interact with the slideshow content without affecting the shared display. For example, a participant device may select the virtual model. An XR framework may generate for display an instance of the virtual model at the participant device via the virtual connection and the videoconferencing system. A participant, via the participant device, may interact with the instance of the virtual model, for example, to view an earlier displayed slide at the participant device without changing a currently viewed slide in the shared display of the slideshow content.

The XR framework 102 may generate a virtual connection between the devices 104 and 106 based on their virtual proximity. For example, upon receiving selection of the device 136 (e.g., via interaction 149 and/or UI 150), the XR framework 102 may generate a virtual connection between the device 116, the device 104, and the device 106. In some aspects, the virtual connection links the paths 108 and 109, which enables sharing of externally linked devices with the devices 104 and/or 106 (e.g., sharing the device 112 with the device 106). For example, the XR framework 102 may cause devices 104 and/or 106 to perform one or more functions of a proxy server for sharing externally linked devices. For example, the XR framework 102 may generate a virtual proxy device at the device 104 for transmitting the content 114 from the device 112 to the device 106 via the virtual connection. In some embodiments, the XR framework 102 may generate a virtual connection configured as a stable, dedicated communication path between the devices 104 and 106 and/or one or more externally linked devices. For example, the virtual connection may include paths 108, 109 and an external link between device 104 and device 112. In some embodiments, the XR framework 102 may share one or more applications and associated data (e.g., via an application programming interface (API)) between the devices 104 and 106 using the virtual connection. The capabilities of the device 104 may be available to the device 106. For example, a gaming application may be hosted and/or otherwise accessible at the device 104. A virtual bridge may enable the device 106 to access the gaming application that device 104 has permitted (e.g., allowing device 106 to transmit control instructions remotely for the gaming application). In some embodiments, the XR framework 102 may dynamically generate, maintain, and remove virtual connections between virtually proximate devices. For example, if the sharing mode for device 116 is deactivated at device 104, the XR framework 102 may detect that the sharing mode has ended and remove the corresponding virtual connection (e.g., between paths 108, 109).

As a detailed illustrative example for the scenario 100, a first user device 104 may be externally linked to user equipment (e.g., a home theater system including devices 112, 116). The first user device 104 may be connected to a VE 130 (e.g., via a metaverse-based application) generated and/or hosted at a server of the XR framework 102. In this instance, a first communication path 108 between the first user device 104 and the server may include a first plurality of intermediate nodes (e.g., edge servers). The XR framework 102 may dynamically configure the network topology of the first communication path 108, for example, by selecting and deselecting intermediate nodes and/or arranging path segments between nodes to ensure a stable, reliable data transmission rate from the server to the first user device 104. In a similar manner, a second user device 106 may be connected to the same server or another server of the XR framework 102 through a second communication path 109 (e.g., via a second plurality of intermediate nodes). In this instance, the XR framework 102 may generate a virtual connection from the first user device to the second user device through manipulation of the network topology for paths 108, 109. In one instance, if the paths 108, 109 have an intermediate node in common, the XR framework 102 may virtually bridge the paths 108, 109 by routing the data through the intermediate node. The XR framework 102 may generate a data structure for the devices that are linked via the virtual connection (e.g., a forwarding database, a forwarding information base, a MAC table, a relational database, in associative memory or cache, etc.). The data structure may include the information (e.g., device IDs, addresses, etc.) for directing data traffic transmitted via the virtual connection.

Continuing this illustrative example, the XR framework 102 may determine a third communication path (not shown) between the first user device 104 and the second user device 106. The third communication path may include portions of paths 108, 109 and/or a different plurality of nodes. In one instance, the XR framework 102 may map one or more nodes between the first and second plurality of intermediate nodes and, based on the mapping, determine the third communication path (e.g., using a pathfinding technique). Some examples of pathfinding techniques include Dijkstra's algorithm and its variants (e.g., A* algorithm), hierarchical path finding, multi-agent planning, incremental heuristic search-enhanced pathfinding, Viterbi algorithm, Johnson's algorithm, Floyd-Warshall algorithm, Bellman-Ford algorithm, etc. In some embodiments, based on the determined communication path between devices 104 and 106, the XR framework may assign particular nodes as part of a virtual connection. In some embodiments, the XR framework may generate a virtual connection communicatively coupling the first and second user devices based on determining the third communication path. In embodiments where a group of virtually proximate devices is interconnected, the XR framework may form a virtual network comprising a plurality of virtual connections between devices. For example, the XR framework may assign one or more intermediate nodes as dedicated servers for the virtual network and have externally linked devices transmit data between devices through a particular path of the virtual network.

In one example, the device 104 may transmit an indication that the device 116 (e.g., a Bluetooth speaker) is shareable to other avatars in the VE 130. Based on the indication, the XR framework 102 may generate advertising and discovery services of the device 116 in the VE 130 and/or generate an interactive representation or digital twin of the device 116 (e.g., model 136). As an example, the XR framework 102 may generate a virtual user interface in the VE that lists the discoverable devices. The device 106 may virtually pair and/or connect with the Bluetooth speaker, for example, by selecting a status indicator 158 corresponding to the device 116 in the virtual user interface through the avatar 146. The XR framework 102 generates the instructions for device information exchange and establishes a communication path, or virtual bridge, for pairing and connecting the device 116 and the device 106. For example, the device 106, via the virtual bridge, may receive pairing information similar to the pairing information stored at the device 104 for the device 116. In some embodiments, the XR framework 102 may access the device information stored at the device 104 for the device 116 (e.g., pairing information). Based on the stored device information, the XR framework 102 may generate and/or transmit the relevant device information for the device 106 to pair and/or connect with the device 116 via the virtual bridge. For example, the device information may include a local IP address for the device 116 that is accessible for the device 104 due to physical proximity and would not be accessible for the device 106. The XR framework 102 may generate a modified address based on the IP address or other device information, where the modified address is accessible for the device 106 via the virtual bridge. In some embodiments, the XR framework may spawn a virtual network that extends the communication path between the device 116 and the device 104 to include the device 106. The XR framework may generate device/connection information (e.g., device addresses, network addresses, etc.) for the devices in the virtual network. In this manner and others described herein, the virtual bridge communicatively couples the device 116, the device 104, and the device 106.

In some embodiments, the XR framework 102 generates a virtual device (e.g., a digital twin of the device 116) by replicating the various protocol advertising packets, metadata, and other protocol information as a digital representation. The replicated data may be referred to as virtualized data packets. As described herein, a physical device refers to a device at a geographical location (e.g., device 112) and a virtual device refers to a digital representation of a device in a virtual environment (e.g., model 132). Additionally, or alternatively, if the physical device is a content-rendering system (e.g., a Bluetooth speaker, a video decoder, etc.), the XR framework 102 may expose the components (e.g., decoder, codecs, audio output, etc.) of the system as a virtual rendering system. In some embodiments, the XR framework 102 generates virtualized components for the virtual device based on information about the physical device (e.g., specifications, components, a 3D model, etc.). For example, the XR framework 102 may receive a request from one or more XR devices for a first XR device to share a physical device. The first XR device may indicate an acceptance of the request. Based on the indication from the first XR device, the XR framework 102 may generate a virtual device that includes capabilities mirroring the physical device (e.g., music playback, volume control, etc.).

In some embodiments, the XR framework 102 receives various data packets (e.g., RF advertisement packets, RF protocol packets, etc.). The XR framework 102 may convert the data packets to virtualized data packets for transmitting via a virtual bridge and vice versa. The XR framework 102 may apply a ray tracing technique for determining a position in the VE 130 that would be within a broadcast range of virtualized data packets from a virtual device. As an example, in a VE (e.g., in a metaverse-type environment), a first virtual avatar (e.g., avatar 144) moves into a range or a predefined virtual proximity threshold (e.g., space 140, based on the VE's coordinate system, collision detection, etc.) to a second virtual avatar (e.g., avatar 146). The XR framework 102 may transmit virtualized data packets from a content-rendering system to the device corresponding to the second avatar (e.g., device 106) via a virtual bridge. Alternatively, the XR framework 102 may pair a physical device connected to the device corresponding to the second avatar with a virtual device via the virtual bridge. As an example, the XR framework 102 may receive selection of an option for pairing a virtual device (e.g., a digital twin of a physical device including a radio, a mobile phone, an XR headset, etc.) and a physical device (e.g., a mobile phone, a playback system, etc.). The XR framework 102 may convert virtualized data packets from the virtual device to data packets suitable for the physical device. In one instance, the XR framework 102 may instruct an XR device (e.g., device 104) to broadcast the converted data packets.

In some embodiments, the XR framework 102 may modify output characteristics (e.g., audio output characteristics, haptic feedback, etc.) based on positioning of virtual representations in a VE. For example, audio output characteristics may include an audio output volume, audio effects, etc. For example, speech volume between avatars 144 and 146 may be increased or decreased based on the distance between positions of the avatars in the VE 130. For example, the model 136 (e.g., a virtual speaker) may be closer to avatar 146 than avatar 144 in the VE 130. The model 136 may be outputting music or other audio content. The XR framework 102 may modify the music by adjusting the volume level, adding audio effects (e.g., echo), include synthesized audio, etc. The XR framework 102 may generate a first modified audio for user device 104 and a second modified audio for user device 106. In this instance, the first and second modified audio may have been altered to reflect the acoustic difference based on distance of the avatars 144, 146 from the model 136. For example, the first modified audio may have a reduced volume relative to the second modified audio.

Figure 2:
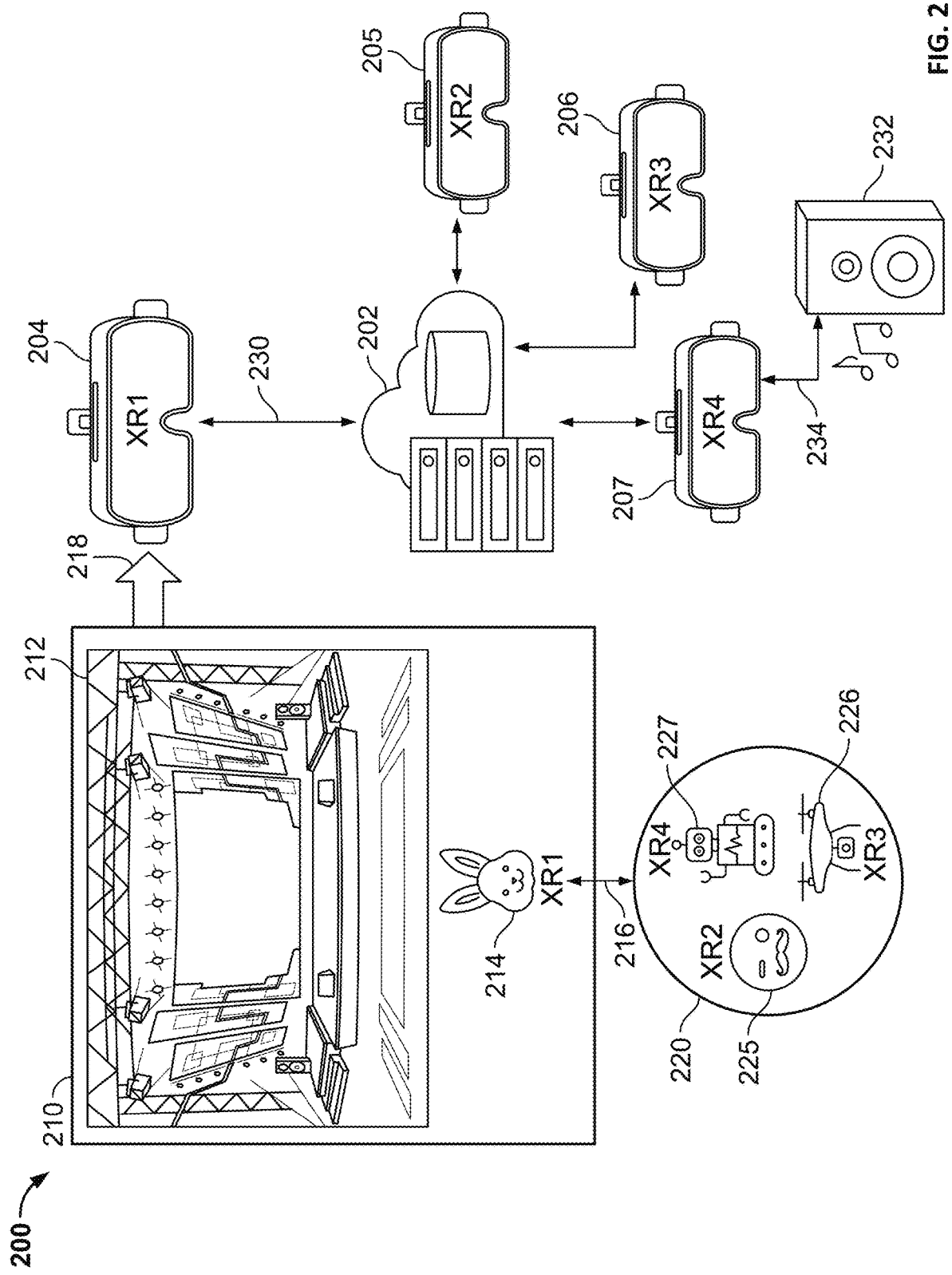
FIG. 2 shows an example scenario of an XR framework linking a device associated with a virtual representation at a virtual event in a virtual environment with a group of virtually proximate devices, in accordance with some embodiments of this disclosure.

FIG. 2 shows an example scenario 200 of an XR framework 202 linking a device 204 associated with a virtual representation at a virtual event 212 in a virtual environment 210 with a group of virtually proximate devices 205-207, in accordance with some embodiments of this disclosure. In the scenario 200, the XR framework 202 may be connected to four XR devices 204-207 (labeled XR1-XR4). For example, the XR framework 202 may be communicatively coupled to device 204 via a communication path 230. Each of XR devices 204-207 may be respectively associated with virtual representations such as avatars 214, 225-227. The XR framework 202 may include a virtual connection 216 that connects the devices 204-207 based on their respective avatars. The device 207 may be connected to an external device 232 via an external link 234 (e.g., via a local network). In the scenario 200, the devices 205-207 may be virtually proximate due to accessing a virtual space 220 via their respective avatars 225-227. The device 204 may exchange communication protocols with the virtual space 220 and/or one or more of the devices 205-207. The XR framework 202, based on the protocol exchange, establishes a virtual connection 216 between the device 204 and/or one or more of the devices 205-207 in the virtual space 220. In this manner, the device 204 may be considered virtually proximate to the devices 205-207 while the associated avatar 214 is located in a space different from the virtual space 220. The XR framework 202 may maintain the virtual connection 216 based on the exchanged communication protocols.

The VE 210 may include the virtual event 212 (e.g., a virtual concert). In some instances, the VE 210 illustrates display of the virtual event 212 based on a viewpoint of the avatar 214 as an output 218 for display at the device 204. In the scenario 200, the avatar 214 may be attending the virtual event 212. The XR framework 202 may generate various content as part of the virtual event 212 (e.g., lights, music, visual effects, virtual devices, user avatars, haptic feedback, etc.). The device 204 may view the virtual event 212 as an output 218 through the viewpoint of avatar 214. The device 204 may include a haptic feedback engine for reproducing an immersive experience as experienced through avatar 214 (e.g., replicating the bass vibration or crowd interactions at a virtual rock concert via device haptics). The XR framework 202 may receive selection of an option (e.g., via the device 204) to share the output 218 with devices 205-207. In some instances, one or more of the devices 205-207 may transmit a request for accessing the content from the virtual event 212, and the device 204 may indicate acceptance of the request. The XR framework 202 may identify the virtual connection 216 for transmitting content of the virtual event 212. The XR framework 202 may transmit the content via the virtual connection 216 to the devices 205-207 and/or the avatars 225-227. For example, the XR framework 202 may generate a floating overlay in the virtual space 220 that displays the virtual event 212 for viewing by the avatars 225-227.

In some embodiments, the XR framework 202 may generate one or more virtual connections for parallel transmission of different content portions of a content item (e.g., based on characteristics including content types, packet sizes, video, audio, interactions, etc.). In such embodiments, the XR framework 202 may transmit an instruction and/or associated information for combining the content portions and/or generating the content for presentation at the devices 205-207. For example, the XR framework 202 may generate a first virtual bridge for video content and a second virtual bridge for audio content. In this example, the first virtual bridge may include a first intermediate node configured for multicasting. Similarly, the second virtual bridge may include a second intermediate node configured for multicasting. In some instances, the XR framework 202, when generating the virtual bridges, may configure the first and second intermediate nodes to exclusively multicast to the devices 205-207 while the virtual bridges and/or the content transmission are active. In some instances, the intermediate nodes may generate the content for output based on the instructions from the XR framework 202 prior to transmitting through the last path segment to one or more of the devices 205-207. In some instances, the devices 205-207 may generate the content for output during receipt of the transmission based on the instructions from the XR framework 202.

In some embodiments, the XR framework 202 identifies at least one intermediate node for each of the plurality of user devices (e.g., devices 205-207) and generates a virtual connection for each user device that includes the corresponding intermediate node. For example, the XR framework 202 may identify an edge server having improved transmission qualities for device 205 but may not be suitable for transmission to device 207. The XR framework 202 may generate a virtual bridge to device 205 that includes the edge server and generate another virtual bridge for device 207 that indicates a different communication path.

In some embodiments, a virtual representation of a first user device may be a virtual broadcasting device. For example, the avatar 214 of the XR device 204 may be configured to perform the broadcasting functions of a virtual radio (e.g., based on user settings for the avatar 214). In this example, the avatar 214 may be configured for broadcasting within the VE 210 and for being perceived in a similar manner as an audio broadcast (e.g., a speaker system). In some embodiments, a second user device (e.g., device 205) may transmit a request to connect to the virtual broadcasting device. Additionally, or alternatively, an avatar (e.g., avatar 225) associated with the second XR device may be within a reception range of the virtual broadcasting device (e.g., via the virtual connection 216). The second XR device may receive content and/or associated data via a virtual connection of the XR framework 202. For example, the XR framework 202 may detect the avatar 225 in the VE 210 is within an audible range of a broadcast from the avatar 214 acting as a virtual radio. In response, the XR framework 202 may transmit the broadcast to the device 205 via the virtual connection 216. Alternatively, the XR framework 202 may generate another virtual connection (not shown) that communicatively couples the virtual radio and the device 205, allowing the broadcast in the VE 210 to be received at the device 205.

In some embodiments, the virtual connection 216 enables routing of content from a virtual device to a physical device (e.g., device 232) externally linked to a user device (e.g., device 207). For example, an avatar 214 of the XR device 204 may approach a virtual building (e.g., cathedral, mosque, concert hall, location of event 212, etc.) in the VE 210. A virtual bridge of the XR framework 202 may allow the device 207 to receive the sounds from the virtual building (e.g., bells, sounds at event 212) for playing on a home speaker system (e.g., device 232) externally connected to the device 207. In some embodiments, a group of virtual representation (e.g., avatars 214, 225-227) may access the same virtual space 220 for a shared activity in the virtual space 220 (e.g., an audio listening party). For example, the XR framework 202 may assign a primary role for the avatar 214 to provide music to the virtual space 220. The group of avatars 225-227, and their corresponding devices 205-207, receive the music. Each of devices 205-207 may play the music via their respective media devices (e.g., device 232 for device 207).

In some embodiments, the XR framework 202 may selectively transmit one or more content items between a plurality of devices, including physical and/or virtual devices, via a virtual connection. For example, the XR framework 202 may receive content from user equipment externally linked to a first user device via a virtual bridge. The received content may be presented at a virtual device in a VE, at one or more virtually proximate devices, and/or at one or more virtually paired physical devices. The XR framework 202 may determine which output devices based on a selection of one or more devices for presenting the received content. In one instance, the first user device may select a virtual device in a VE and/or a second user device as the output device(s). In some embodiments, the XR framework 202 may determine one or more output devices for presenting the content based on virtual proximity of their respective virtual representations in the VE. In one instance, the XR framework 202 may determine that a virtual device and a second user device are virtually proximate to a first user device and cause the content to be outputted at the virtual device and the second user device. It is contemplated that there may be multiple configurations available for selectively sharing content via a virtual connection, and the examples described herein are intended to be illustrative and non-limiting. The following paragraph describes one non-limiting example.

As an illustrative example, the XR framework 202 may generate a virtualized audio playback system, or virtual system, in a VE 210. A smartphone may be virtually proximate to the virtual system. The smartphone may be externally linked to a smart home system. An XR headset may be connected to the smartphone via a virtual connection of the XR framework 202. A podcast may be presented from the virtual system as a broadcast in the VE. A movie may be transmitted to the VE via the XR headset. In some instances, the movie may be generated for display (e.g., as video frames, segments, etc.) at the XR headset, at user equipment (e.g., a home theater system, set-top box, etc.), and/or another content provider system. The movie, or portions thereof, may be generated for display prior to transmitting the movie to the XR framework 202. The XR framework 202 may determine that the smartphone, or an avatar thereof, is within range to receive the podcast in the VE 210 (e.g., the avatar is within listening range of the VE broadcast). The XR framework 202 may transmit the podcast and the movie to the smartphone. The XR headset may select the smartphone as an output device for presenting the movie. The smartphone may select the smart home system as an output device for presenting the podcast. The XR framework 202, based on these selections, may transmit instructions to the corresponding devices. The instructions may be configured to cause the movie to be outputted at the smartphone and cause the podcast to be outputted at the smart home system (e.g., at speakers of the smart home system). As another example with a similar configuration, the first user device may be a first XR headset and the second user device may be a second XR headset. The second XR headset may transmit user audio captured by a microphone of the second headset. For example, the user audio may include user speech during online social events such as a gaming session, a video conference, a metaverse-based gathering, etc. Background sounds (e.g., ambience, background music, etc.) may be coming from the VE 210 (e.g., as heard by avatars within the VE). The XR framework 202 may determine that the first XR headset corresponds to the user audio and that the smart home system corresponds to the background sounds. In this instance, the XR framework 202 may selectively transmit, via a virtual connection, the user audio for output at the first XR headset and the background sounds for output at the smart home system.

It is noted that the scenarios 100, 200 are intended to be illustrative and non-limiting. An XR framework as described herein may provide connectivity through proxying virtually proximate devices in various situations. Some illustrative, non-limiting examples are described as follows. For example, a first user device (e.g., a smartphone, an XR headset, etc.) could be paired with a Bluetooth speaker outside a Bluetooth connectivity range through a virtually proximate second user device externally connected to the Bluetooth speaker. A virtual bridge may be generated as an optimized communication path between the first user device and the Bluetooth speaker, enabling the first user device to play music from the speaker through audio output components of the first user device and/or broadcast to linked devices (e.g., a smart home speaker system). In a second example, a device in a group of virtually proximate devices may enable a discoverable mode for an externally linked device through a virtual bridge. The externally linked device may be paired to the device group in the VE, enabling synchronized delivery of content to the group, e.g., for replicating the video and/or audio of an MR concert attended by one or more digital avatars of the group of devices. As a third example, an avatar controlled via a user device could access a virtual space (e.g., modeled after a café). The user device may stream the sights, sounds, and ambience of the virtual space (e.g., the music playing in the background of the virtual café). Based on a device or application configuration, a user device may continue streaming content received from the virtual space via a virtual bridge while the avatar is idle in the virtual space, e.g., for playing the background music.

Figure 3:
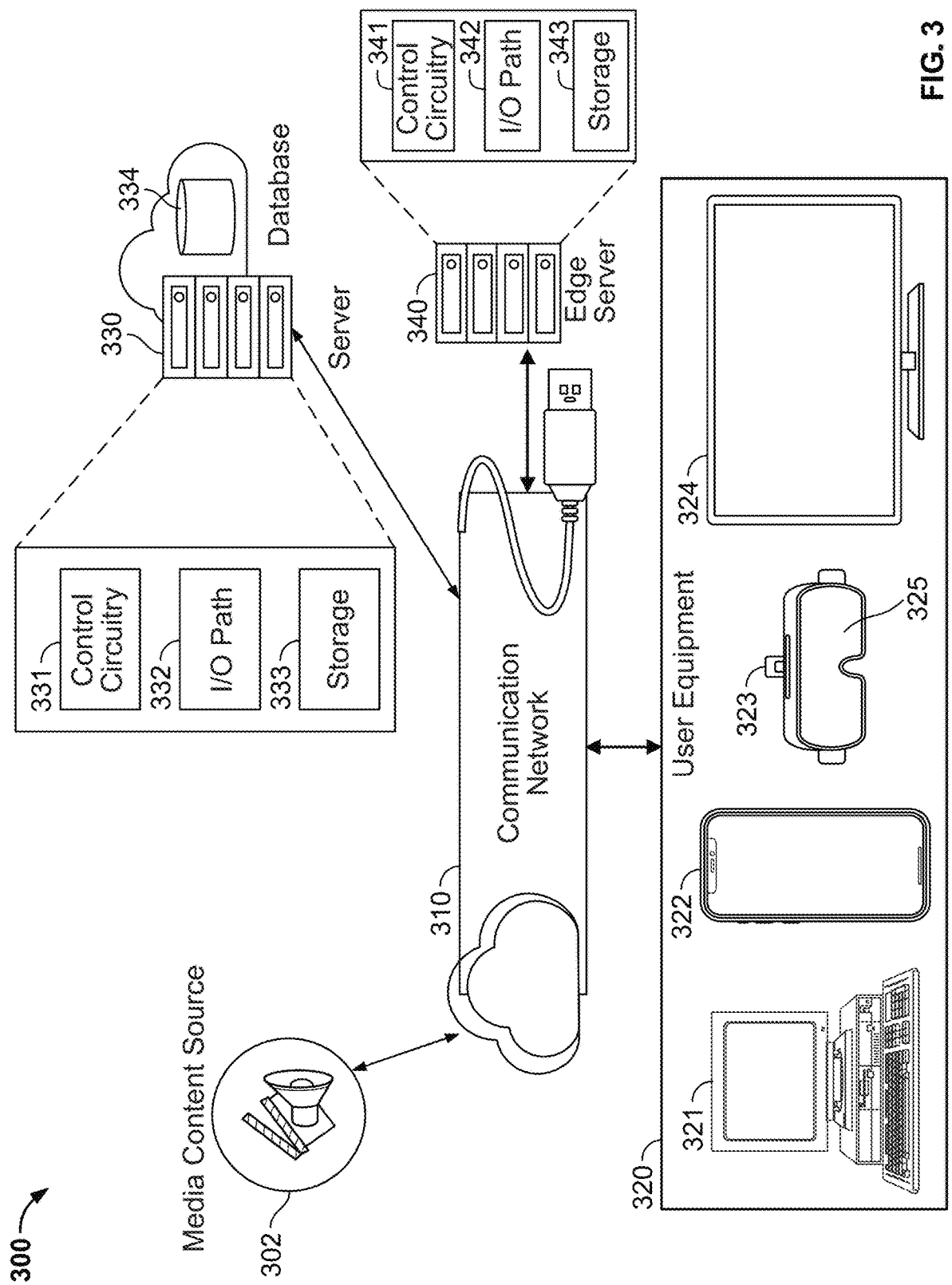
FIG. 3 shows an illustrative system for consuming content (e.g., media content, XR content, etc.), in accordance with some embodiments of this disclosure.

FIG. 3 shows an illustrative system 300 for consuming content (e.g., XR content), in accordance with some embodiments of this disclosure. System 300 may include components for generating and providing XR content (e.g., encoder, decoder, network components, content delivery networks (CDN), etc.). System 300 may comprise media content source 302, one or more servers 330, and one or more edge servers 340 (e.g., included as part of an edge computing system). System 300 may comprise user equipment devices 320 (e.g., devices 321-324) and/or any other suitable number and types of user equipment capable of transmitting data by way of communication network 310.

Media content source 302, server 330 or edge server 340, or any combination thereof, may include one or more content processing devices (e.g., an encoder, graphics processing devices, etc.). The content processing devices may comprise any suitable combination of hardware and/or software configured to process data to reduce storage space required to store the data and/or bandwidth required to transmit the image data, while minimizing the impact on the quality of the content being processed. In some embodiments, the data may comprise raw, uncompressed extended reality (3D and/or 4D) media content, or extended reality (3D and/or 4D) media content in any other suitable format. In some embodiments, each of user equipment devices 320 may receive processed data locally or over a communication network (e.g., communication network 310). In some instances, the devices 320 may comprise one or more converters (e.g., a decoder). Such a converter may comprise any suitable combination of hardware and/or software configured to convert received data to a form that is usable as video signals and/or audio signals or any other suitable type of data signal, or any combination thereof. User equipment devices 320 may be provided with processed data and may be configured to implement one or more machine learning models to obtain an identifier of an element in a data structure and/or render a color for a particular voxel based on the identified element. In some embodiments, at least a portion of processing may be performed remote from any of the user equipment devices 320.

User equipment devices 320 may include an illustrative head-mounted display or any other suitable XR device capable of providing XR content for user consumption. Each of the user equipment devices 320 may access, transmit, receive, and/or retrieve content and data via one or more I/O paths coupled to the respective equipment using corresponding circuitry. As an illustrative example based on the device 321, a path to/from the communication network 310 may provide content (e.g., broadcast programming, on-demand programming, Internet content, content available over a local area network (LAN) or wide area network (WAN), and/or other content) and data to control circuitry and/or communication circuitry of the device 321. In some embodiments, control circuitry of the device 321 may be used to send and receive commands, requests, and other suitable data using the path to/from the communication network 310 and the communication circuitry of the device 321. Such a path may communicatively couple control circuitry of the device 321 to one or more other communication paths. I/O functions may be provided by one or more of these communication paths but may be shown as a single path to avoid overcomplicating the drawing. One or more of the user equipment devices 320 may include or be coupled to a display device 325. In some embodiments, the display device 325 may comprise an optical system of one or more optical elements such as a lens in front of an eye of a user, one or more waveguides, or an electro-sensitive plane. For example, the user equipment devices 320 may include an illustrative head-mounted display or any other suitable XR device capable of providing XR content for user consumption and is further described with respect to FIG. 4.

In some embodiments, an application of an XR framework may be executed at one or more of control circuitry 331 of server 330 (and/or control circuitry of user equipment devices 320 and/or control circuitry 341 of edge servers 340). As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Any device, equipment, etc. described herein may comprise control circuitry. The server 330 may be coupled to a database 334. In some embodiments, one or more data structures discussed herein may be stored at the database 334. The data structures may be maintained at or otherwise associated with server 330, and/or at storage 333 and/or at storage of one or more of user equipment devices 320. Communication network 310 may comprise one or more networks including the Internet, a mobile phone network, a mobile voice or data network (e.g., a 5G, 4G, or LTE network), cable network, public switched telephone network, or other types of communication network or combinations of communication networks. Paths (e.g., depicted as arrows connecting the respective devices to the communication network 310) may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communications with the client devices may be provided by one or more of these communication paths but may be shown as a single path to avoid overcomplicating the drawing. Although communication paths may not be shown between user equipment devices, the devices may communicate directly with each other via one or more communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via communication network 310.

In some embodiments, an XR framework may include a client/server application where only the client application resides on one or more user equipment devices 320, and a server application resides on an external server. For example, an XR framework may be implemented partially as a client application on control circuitry of a user equipment device 323 and partially on server 330 as a server application running on control circuitry 331. Server 330 may be a part of a local area network or may be part of a cloud computing environment accessed via the Internet. In a cloud computing environment, various types of computing services for performing searches on the Internet or informational databases, generating virtualized components, providing encoding/decoding capabilities, providing storage (e.g., for a database), or processing and parsing data (e.g., using machine learning algorithms described above and below) are provided by a collection of network-accessible computing and storage resources (e.g., server 330 and/or edge server 340), referred to as "the cloud." For example, user equipment devices 320 may include a cloud client that relies on the cloud computing capabilities from server 330 to receive and process data for XR content. When executed by control circuitry of server 330 or 340, an XR framework, or parts thereof, may instruct control circuitry 331 or 341 to perform processing tasks for user equipment devices 320 and facilitate execution of the various processes.

In some embodiments, server 330 may include control circuitry 331 and storage 333 (e.g., RAM, ROM, hard disk, removable disk, etc.). Storage 333 may store one or more databases. Server 330 may also include an input/output (I/O) path 332. I/O path 332 may provide protocol exchange data, device information, or other data, over a local area network (LAN) or wide area network (WAN), and/or other content and data to control circuitry 331, which may include processing circuitry, and storage 333. Control circuitry 331 may be used to send and receive commands, requests, and other suitable data using I/O path 332, which may comprise I/O circuitry. I/O path 332 may connect control circuitry 331 to one or more communication paths.

Edge computing server 340 may comprise control circuitry 341, I/O path 342 and storage 343, which may be implemented in a similar manner as control circuitry 331, I/O path 332 and storage 333, respectively, of server 330. Edge server 340 may be configured to be in communication with one or more of user equipment devices 320 (e.g., devices 321-324) and/or a video server (e.g., server 330) over communication network 310 and may be configured to perform processing tasks (e.g., encoding/decoding) in connection with ongoing processing of video data. In some embodiments, a plurality of edge servers 340 may be strategically located at various geographic locations and may be mobile edge servers configured to provide processing support for mobile devices at various geographical regions.

Control circuitry 331, 341 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 331, 341 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 331, 341 executes instructions for an emulation system application stored in memory (e.g., the storage 333, 343). Although not shown, memory may be an electronic storage device provided as storage 333, 343 that is part of respective control circuitry 331, 341.

Figure 4:
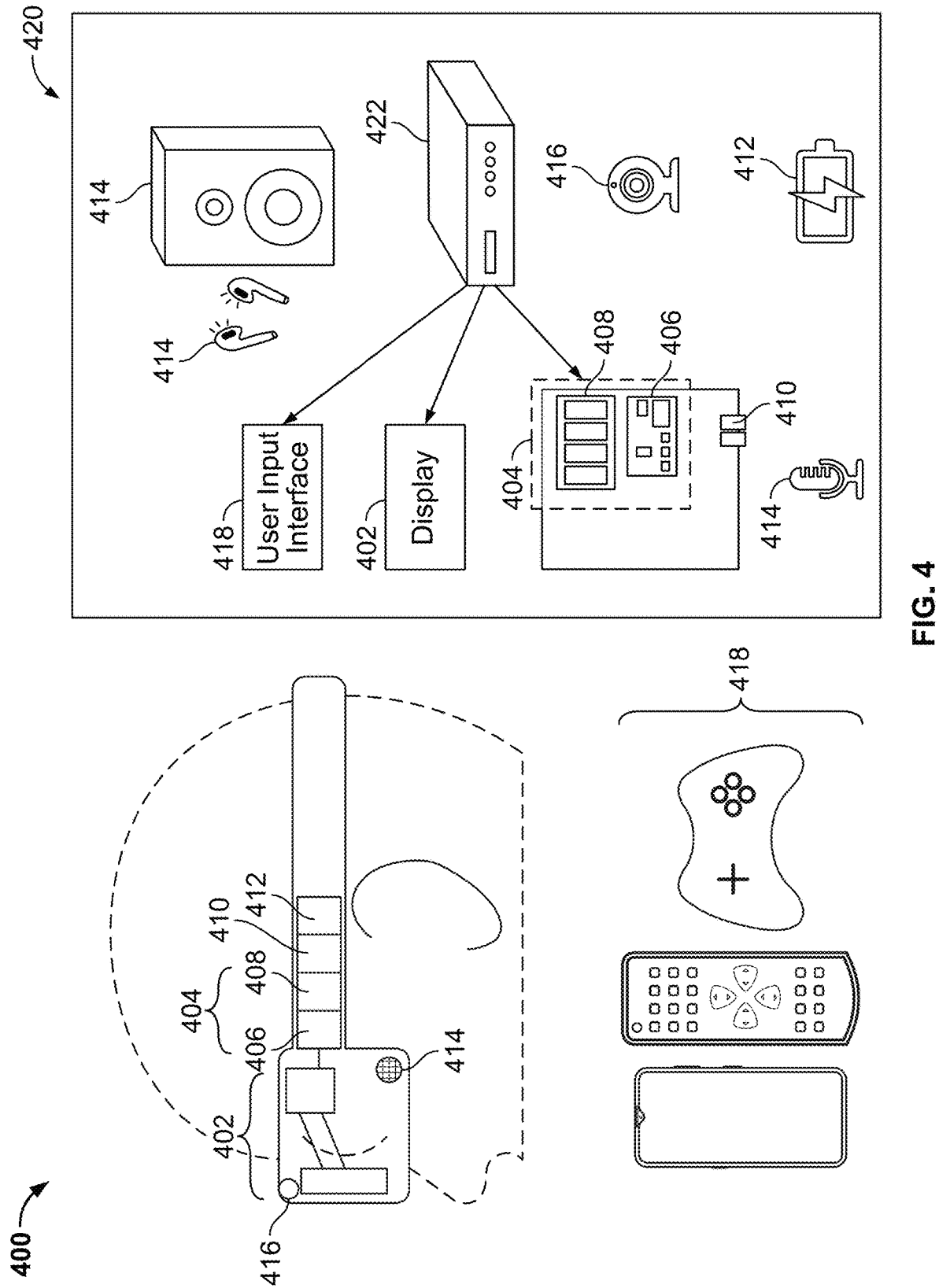
FIG. 4 shows illustrative user equipment for consuming XR content including an example XR device, in accordance with some embodiments of this disclosure.

FIG. 4 shows illustrative user equipment for consuming XR content including example XR user equipment 400, in accordance with some embodiments of this disclosure. Equipment 400 may depict an illustrative head-mounted display or any other suitable XR device capable of providing XR content for user consumption. Equipment 400 comprises display 402, control circuitry 404 comprising processor 406 and memory 408, input/output (I/O) path 410, and power source 412. Equipment 400 may comprise one or more of integrated audio I/O components 414 and/or camera 416.

Equipment 420 may depict a generalized embodiment of device components that correspond to parts of equipment 400 and/or are coupled to equipment 400. In some embodiments, equipment 400 may be stand-alone or communicatively coupled to a system hub 422. For example, hub 422 may be a set-top box or a gaming console. Any suitable computing device having processing circuitry, control circuitry, and storage may be used in accordance with the present disclosure. For example, hub 422 may include, or be complemented by, a personal computer (e.g., a notebook, a laptop, a desktop), a smartphone, a tablet, a network-based server hosting a user-accessible client device, a non-user-owned device, any other suitable device, or any combination thereof. Equipment 400 may be coupled to external user devices and/or equipment via the hub 422. For example, the hub 422 may be coupled to external audio equipment (e.g., integrated audio I/O components 414 including speakers, headphones, and/or microphone) and/or camera 416 for supplementing the integrated components of equipment 400.

Each of the user equipment 400 and 420 may access, transmit, receive, and/or retrieve content and data via one or more I/O paths coupled to the respective equipment using corresponding circuitry. As an illustrative example based on equipment 400, I/O path 410 may provide content (e.g., broadcast programming, on-demand programming, Internet content, content available over a local area network (LAN) or wide area network (WAN), and/or other content) and data to control circuitry 404. Control circuitry 404 may be used to send and receive commands, requests, and other suitable data using I/O path 410 and the communication circuitry. I/O path 410 may communicatively couple control circuitry 404 to one or more communication paths. I/O functions may be provided by one or more of these communication paths but may be shown as a single path to avoid overcomplicating the drawing.

Display 402 may depict a generalized embodiment of display device 325. Display 402 may comprise an optical system of one or more optical elements such as a lens in front of an eye of a user, one or more waveguides, or an electro-sensitive plane. The display 402 comprises an image source providing an image beam to the optical element. The image beam may be modified (e.g., diffracted) using one or more elements of the optical system. For example, a 3D image may be displayed as output of the optical system in front of the eye of the user at the lens. The display 402 may be a 3D display. Some non-limiting examples of a display include a tensor display, a light field display, a volumetric display, a multi-layer display, an LCD display, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying XR content.

Control circuitry 404 may be based on any suitable control circuitry. Control circuitry 404 may comprise processor 406 and/or memory 408. Processor 406 may include video processing circuitry (e.g., integrated and/or a discrete graphics processor). In some embodiments, control circuitry 404 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an XR framework, or parts thereof, stored in memory (e.g., memory 408). Specifically, control circuitry 404 may be instructed by an XR framework, or parts thereof, to perform any of the functions described herein. In some implementations, processing or actions performed by control circuitry 404 may be based on instructions received from an XR framework or parts thereof. Control circuitry 404 may be configured to generate one or more images for display via the equipment 400 and instruct the optical system to produce one or more image beams corresponding to the one or more images at display 402.

Control circuitry 404 may be based on any suitable control circuitry. Control circuitry 404 may comprise processor 406 and/or memory 408. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Processor 406 may include video processing circuitry (e.g., integrated and/or a discrete graphics processor). In some embodiments, control circuitry 404 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an XR framework, or parts thereof, stored in memory (e.g., memory 408). Specifically, control circuitry 404 may be instructed by an XR framework, or parts thereof, to perform any of the functions described herein. In some implementations, processing or actions performed by control circuitry 404 may be based on instructions received from an XR framework or parts thereof. Control circuitry 404 may be configured to generate one or more images for display via the equipment 400 and instruct the optical system to produce one or more image beams corresponding to the one or more images at display 402.

Control circuitry 404 may include or be communicatively coupled to video generating circuitry and tuning circuitry, such as one or more analog tuners, one or more H.265 decoders or any other suitable digital decoding circuitry, high-definition tuners, or any other suitable tuning or video circuits or combinations of such circuits. Conversion circuitry (e.g., for converting over-the-air, analog, or digital signals to MPEG signals for storage) may also be provided. Control circuitry 404 may also include scaler circuitry for upconverting and downconverting content into a suitable output format of user equipment 400. Control circuitry 404 may also include or be communicatively coupled to digital-to-analog converter circuitry and analog-to-digital converter circuitry for converting between digital and analog signals. The tuning and generating circuitry may be used by user equipment 400 to receive and to display, to play, or to record content. The tuning and generating circuitry may also be used to receive video generating data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If memory 408 is provided or supplemented by a separate device from user equipment 400, the tuning and generating circuitry (including multiple tuners) may be associated with memory 408.

Memory 408 may be any device for storing electronic data, such as random-access memory, solid state devices, quantum storage devices, hard disk drives, non-volatile memory or any other suitable fixed or removable storage devices, and/or any combination of the same. Memory may be an electronic storage device that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Memory 408 may store data defining images for display by the head-mounted display. Memory 408 may be used to store various types of content described herein including XR asset data. Nonvolatile memory may also be used (e.g., to launch a boot-up routine and other instructions). Cloud-based storage may be used to supplement memory 408 or instead of memory 408.

Control circuitry 404 may include or be coupled to communication circuitry suitable for communicating with a server, edge computing systems and devices, a table or database server, or other networks or servers. The instructions for carrying out the above-mentioned functionality may be stored on a server. Such communications may involve the Internet or any other suitable communication networks or paths. In addition, communication circuitry may include circuitry that enables peer-to-peer communication of user equipment devices, or communication of user equipment devices in locations remote from each other. In some embodiments, I/O path 410 comprises circuitry that communicatively couples the head-mounted display to one or more other devices over a network. For example, I/O path 410 may include a network adaptor and associated circuitry. I/O path 410 may comprise wires and/or busses for connecting to a physical network port (e.g., an ethernet port, a wireless WiFi port, cellular communication port, or any other type of suitable physical port). Although communication paths are not shown between user equipment devices, any of the described devices and equipment may communicate directly or indirectly with each other via one or more communication paths and/or communication networks including short-range, point-to-point communication paths, such as USB cables, IEEE 1394 cables, wireless paths (e.g., Bluetooth, infrared, IEEE 802-11x, etc.), or other short-range communication via wired or wireless paths. For example, I/O 410 may include a Bluetooth network adaptor.

Power source 412 comprises a source of power or the interfaces for coupling a power source to the display 402, control circuitry 404, memory 408, and/or I/O path 410. While not shown, power source 412 may be coupled to other components of equipment 400. Some non-limiting examples of a power source include a battery, solar generator, and/or a wired power source.

Audio I/O equipment 414 may be provided as integrated with other elements of each one of equipment 400, 420 or may be stand-alone units. An audio component of videos and other content may be played through speakers (or headphones) of audio I/O equipment 414. In some embodiments, audio may be distributed to a receiver (not shown), which processes and outputs the audio via speakers of audio I/O equipment 414. In some embodiments, for example, control circuitry 404 is configured to provide audio cues to a user, or other audio feedback to a user, using speakers of audio output equipment 414. There may be a separate microphone and/or audio I/O equipment 414 may include a microphone configured to receive audio input such as voice commands or speech. For example, a user may speak letters or words that are received by the microphone and converted to text by control circuitry 404. As a second example, a user may voice commands that are received by a microphone and recognized by control circuitry 404. Camera 416 may be any suitable video camera integrated with the equipment or externally connected (e.g., via hub 422). Camera 416 may be a digital camera comprising a charge-coupled device (CCD) and/or a complementary metal-oxide semiconductor (CMOS) image sensor. Camera 416 may be an analog camera that converts to digital images via a video card.

In some embodiments, equipment 400 and/or equipment 420 may be communicatively coupled to one or more user input interfaces or devices 418. Some examples of input devices include a remote control, a secondary user device, a touch-sensitive display, a smartphone device, a tablet, a remote control, mouse, trackball, keypad, keyboard, touch-screen, touchpad, stylus input, joystick, voice recognition interface, and/or other user input interfaces. In some embodiments, equipment 400 comprises an integrated user input interface capable of tracking a user's eyes and/or detecting visual and/or audio cues. Equipment 400 may include one or more interface regions for a user to manipulate (e.g., buttons, touch-sensitive bars, etc.). As an example, input interface 418 may include a handheld remote-control device having a microphone and control circuitry configured to receive and identify voice commands and transmit information to equipment 400 directly or via equipment 420.

An XR framework, or parts thereof, may be implemented using any suitable architecture. For example, it may be a stand-alone application wholly implemented on any of user equipment 400, 420. Instructions of the application may be stored locally (e.g., in memory 408), and data for use by the application is downloaded on a periodic basis (e.g., from an out-of-band feed, from an Internet resource, or using another suitable approach). Control circuitry 404 may retrieve instructions of the application from memory 408 and process the instructions to provide networking functionality and perform any of the actions described herein. Based on the processed instructions, control circuitry 404 may determine what action to perform when user input is received. For example, movement of a cursor on a display up/down may be indicated by the processed instructions when input interface 418 indicates that an up/down button was selected.

In some embodiments, an XR framework, or parts thereof, includes a client/server-based application. In client/server-based embodiments, control circuitry 404 may include or be coupled to communication circuitry (e.g., I/O path 410) suitable for communicating with a server or other networks or servers. An XR framework, or parts thereof, may be a stand-alone application implemented on a device or a server. An XR framework, or parts thereof, may be implemented as software or a set of executable instructions. An application and/or any instructions for performing any of the embodiments discussed herein may be encoded on computer-readable media. The computer-readable media may be non-transitory, including, but not limited to, volatile and non-volatile computer memory or storage devices such as a hard disk, floppy disk, USB drive, DVD, CD, media card, register memory, processor cache, random access memory (RAM), a hard drive, random-access memory on a DRAM integrated circuit, read-only memory on a BLU-RAY disk, etc. For example, in FIG. 4, the instructions may be stored in memory 408, and executed by control circuitry 404 of the equipment 400.

Data for use by a thick or thin client implemented on any one of user equipment 400, 420 may be retrieved on demand by issuing requests to a server remote to any one of user equipment 400, 420. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment 400. This way, the processing of the instructions is performed remotely by the server while the resulting displays (e.g., which may include text, a keyboard, or other visuals) are provided locally on equipment 400. Equipment 400 may receive inputs from the user via input interface 418 and transmit those inputs to the remote server for processing and generating the corresponding displays. For example, equipment 400 may transmit a communication to the remote server indicating that an up/down button was selected via input interface 418. The remote server may process instructions in accordance with that input and generate a display of the application corresponding to the input (e.g., a display that moves a cursor up/down). The generated display is then transmitted to equipment 400 for presentation to the user.

In some embodiments, an XR framework, or parts thereof, may be downloaded and interpreted or otherwise run by an interpreter or virtual machine (run by control circuitry 404). In some embodiments, an XR framework, or parts thereof, may be encoded in the ETV Binary Interchange Format (EBIF), received by control circuitry 404 as part of a suitable feed, and interpreted by a user agent running on control circuitry 404. For example, an XR framework, or parts thereof, may include an EBIF application. In some embodiments, an XR framework, or parts thereof, may be defined by a series of JAVA-based files that are received and run by a local virtual machine or other suitable middleware executed by control circuitry 404. In some of such embodiments (e.g., those employing MPEG-2 or other digital media processing schemes), an XR framework, or parts thereof, may be, for example, encoded and transmitted in an MPEG-2 object carousel with the MPEG audio and video packets of a program.

Figure 5:
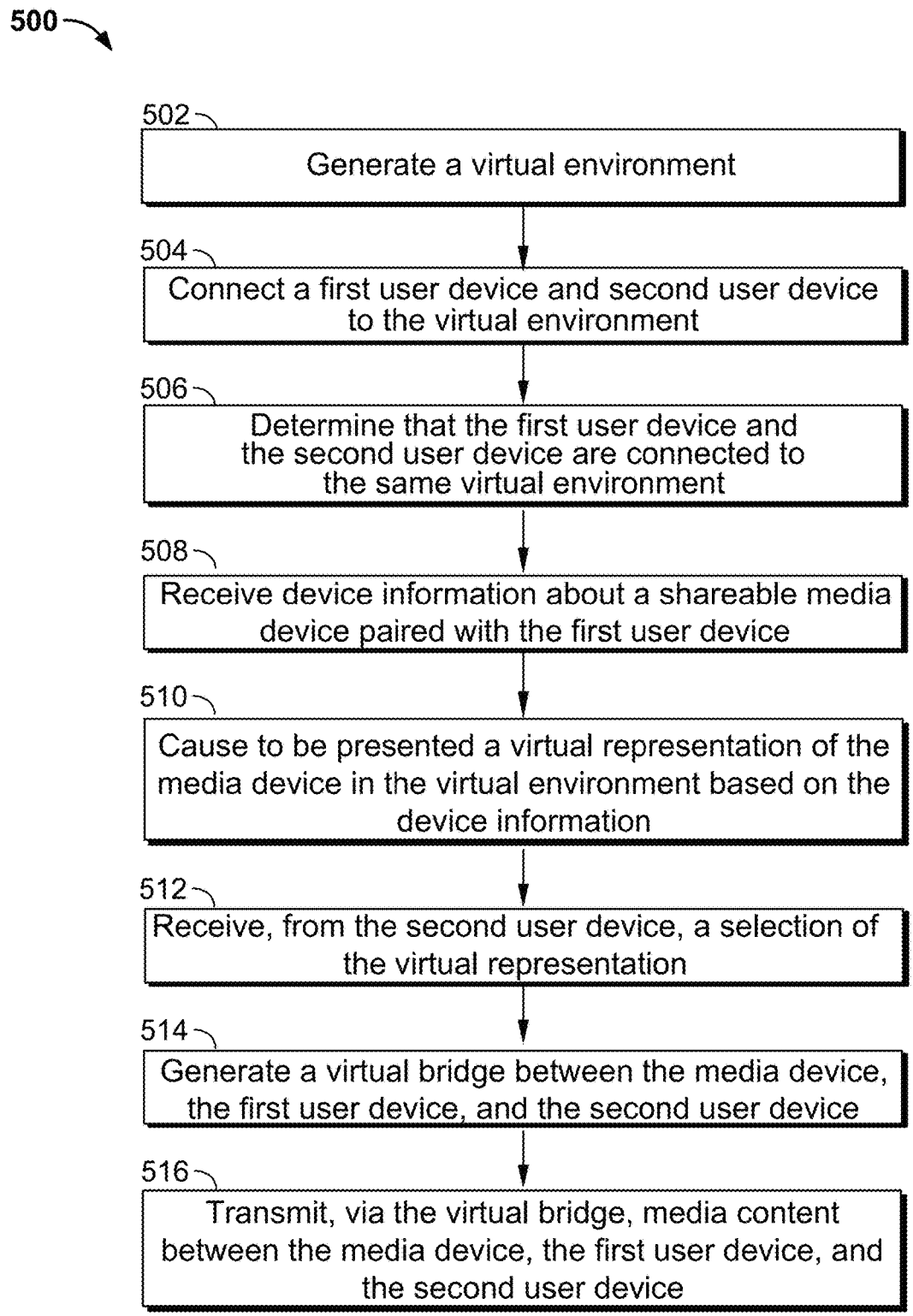
FIG. 5 is a flowchart of an example process for connecting virtually proximate devices, in accordance with some embodiments of this disclosure.

FIG. 5 is a flowchart of an example process 500 for connecting virtually proximate devices, in accordance with some embodiments of this disclosure. In various embodiments, process 500 may be executed via one or more components associated with an XR framework. For example, the process 500 may be implemented, in whole or in part, by the systems 300, 400 at FIGS. 3-4.

At block 502, control circuitry associated with an XR framework, or parts thereof, may generate a virtual environment. At block 504, the control circuitry may connect a first user device and a second user device to the VE. As an illustrative example, referring to FIG. 3, the XR framework may include a server 330 comprising the control circuitry 331. The server 330 may host a VE. The control circuitry 331 may receive, via the communication network 310, requests from the user devices (e.g., user equipment 320) to access the VE at the server 330. Based on the requests, the control circuitry 331 transmits the relevant access information for each user device. For example, any of the user devices 321-324 may request to access the same virtual space.

At block 506, the control circuitry may determine that the first user device and the second user device are virtually proximate, for example, based on connecting to the same virtual space in the VE. In some embodiments, the control circuitry of the XR framework may determine that the user devices have exchanged relevant information (e.g., communication protocols) for initiating a communication link via the VE. For example, referring to FIG. 3, the user device 321 may exchange an access key with the user device 323 and vice versa. The access key may be generated via secure key exchange techniques (e.g., cryptographic, password-authenticated, etc.) via the user devices and/or the XR framework (e.g., an XR engine). At block 508, the control circuitry may receive device information about a media device in a sharing or discoverable mode. For example, the media device may be paired with the first user device. The relevant media device information (e.g., device registration information for the media device) may be stored or is otherwise accessible at the first user device. Based on the media device status, the first user device may indicate to the XR framework (e.g., via communication network 310) that the media device is available for sharing and/or transmit the media device information.

At block 510, the control circuitry may cause a virtual representation of the media device to be presented in the VE. The control circuitry may generate the virtual representation based on the device information. For example, the control circuitry 331 may generate a model of the media device for display in the VE by accessing device information (e.g., device specifications) stored at the database 334 and/or via the communication network 310. For example, the control circuitry 331 may transmit a search query to an Internet-based search engine. For example, the control circuitry 331 may access and/or identify information about the media device for generating the virtual representation of the media device (e.g., from a manufacturer and/or commerce website about the media device). In some embodiments, the control circuitry may generate a virtual broadcast in the VE indicative of the media device being available, for example, by generating a virtual broadcast device at a position or virtual space in the VE.

At block 512, the control circuitry may receive, from the second user device, a selection of the virtual representation. For example, an avatar controlled via the second user device may interact with the virtual representation of the media device or a virtualized media device. For example, referring to FIG. 4, a user, via user equipment 400, may control an avatar using the input interface 418 (e.g., using a controller, via eye tracking, etc.). In response to the avatar contacting the virtualized media device, the user equipment 400 may transmit the interaction data and/or an access request to the control circuitry 331 (e.g., received via I/O path 332). Based on the interaction data, the control circuitry 331 may determine that the user equipment 400 has selected the virtualized media device for access. As a second example, the control circuitry 331 may determine that the avatar interacts with a particular part of the virtualized media device (e.g., a virtual on/off switch) and, based on the interaction, determine that the user equipment 400 is requesting device access.

At block 514, the control circuitry may generate a virtual connection between the media device, the first user device, and the second user device. For example, each user device may have a communication path to the XR framework. For example, the first user device may be connected to a first edge server (e.g., edge server 340) and the second user device may be connected to the same edge server or a second edge server. The control circuitry may generate a virtual bridge between the communication paths to form the virtual connection (e.g., by generating a virtual bridge device between the first and second edge servers and/or nodes thereof). At block 516, the control circuitry may transmit, via the virtual connection, media content between the media device, the first user device, and the second user device. For example, the control circuitry may redirect the media content from the media device to the second user device via the virtual connection. For example, referring to FIG. 3, the control circuitry 331 may generate a dedicated communication path via communication network 310 that links the involved devices using the virtual bridge.

Figure 6:
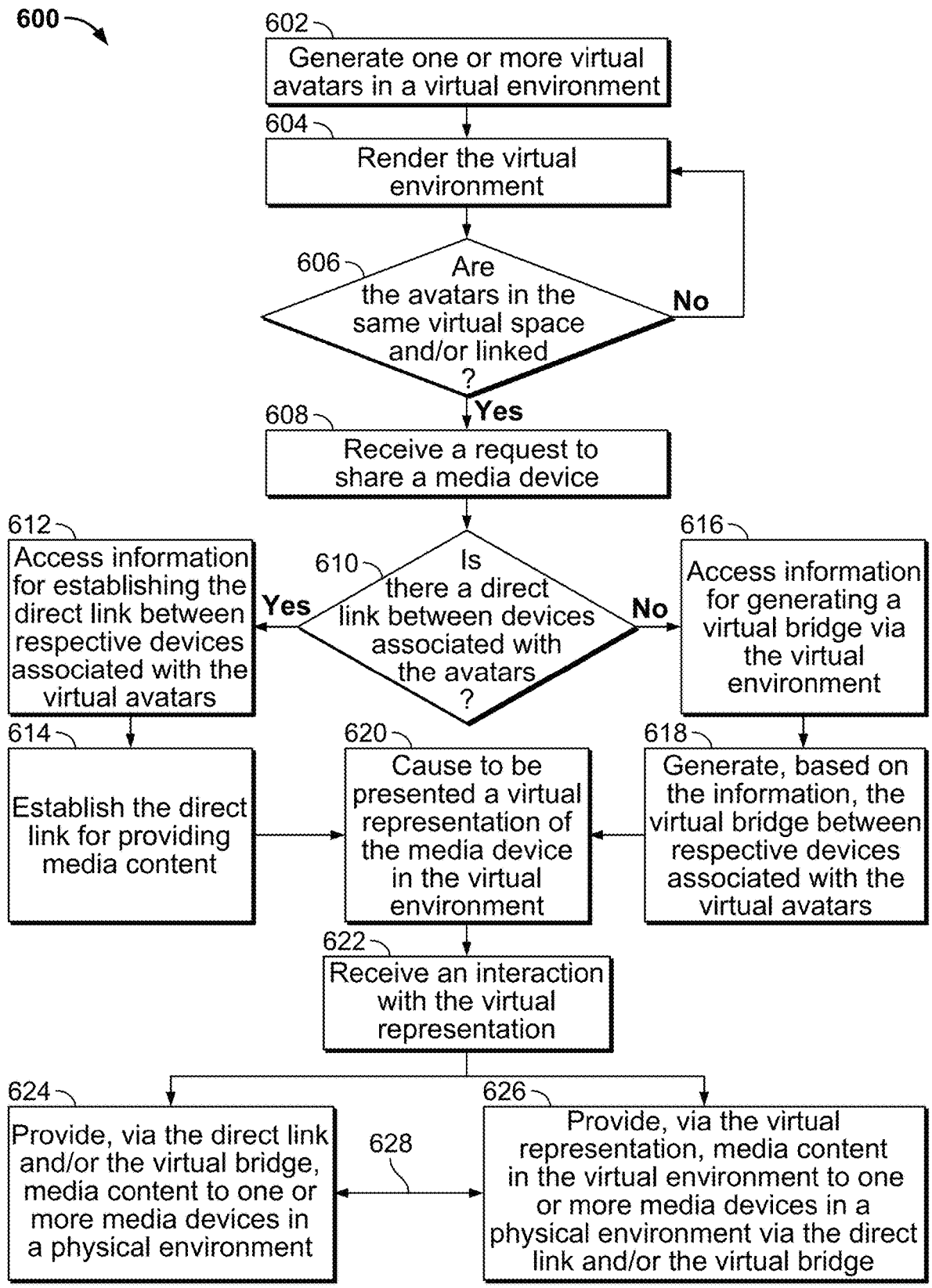
FIG. 6 is a flowchart of an example process for sharing content to virtually proximate devices, in accordance with some embodiments of this disclosure.

FIG. 6 is a flowchart of an example process for sharing content to virtually proximate devices, in accordance with some embodiments of this disclosure. In various embodiments, process 600 may be executed via one or more components associated with an XR framework. For example, the process 600 may be implemented, in whole or in part, by the systems 300, 400 at FIGS. 3-4.

At block 602, one or more virtual representations, or avatars, are generated in a VE via control circuitry associated with an XR framework (e.g., at an XR engine). For example, control circuitry 331 may generate the avatars associated with XR devices connected to the VE. At block 604, the virtual environment is rendered for presenting at the connected XR devices. At block 606, the control circuitry may determine whether the XR devices are virtually proximate. For example, the control circuitry 331 may determine that the avatars are in the same virtual space of the VE. In some embodiments, the control circuitry may track the position of the avatars in the VE to determine that the avatars are within a virtual proximity of each other. In some embodiments, the control circuitry may monitor a connectivity status between avatars and their respective devices. If the XR devices are not virtually proximate ("No" at 606), the control circuitry may continue rendering and/or updating the VE at block 604. If the XR devices are virtually proximate ("Yes" at 606), then the control circuitry may receive or otherwise determine (e.g., via an interaction from one or more avatars and/or between the avatars) a request to share a media device externally linked to a first device of the virtually proximate devices at block 608.

At block 610, the control circuitry may determine whether an external connection (e.g., a direct or local link) between virtually proximate devices is available. For example, if a direct connection via a local network is available ("Yes" at 610), the control circuitry may leverage the direct connection to link the XR devices within the local network. In this example, the control circuitry may establish a local network connection between the XR devices. For example, if a direct connection is available between the media device and the second XR device (e.g., within Bluetooth connectivity range of each other), the control circuitry may determine to link these devices with the direct connection. At block 612, the control circuitry may access information about the direct connection to generate the link between the devices. For example, the control circuitry may access the network addresses of the devices in the local network. At block 614, the control circuitry establishes the external connection for sharing content from the media device, for example, by transmitting one or more instructions to the local network device (e.g., router, hub, etc.) that cause the network device to generate and transmit relevant data for the external connection (e.g., communication protocols, local routing table, forwarding rules, etc.).

At block 610, the control circuitry may determine that an external connection is unavailable. For example, the control circuitry 331 may access positioning information (e.g., via a global positioning system (GPS)) and determine that the device 322 is geographically distant from the device 324 and thus outside a connectivity range for an external connection (e.g., a direct RF-based connection). If an external connection is unavailable ("No" at 610), the control circuitry may access information about the involved devices and the communication paths (e.g., current connections, available nodes, etc.) for generating a virtual connection, including a virtual bridge, in the VE at block 616. At block 618, the control circuitry may generate the virtual connection based on the accessed information. For example, the control circuitry 331 may generate a virtualized bridge device linking nodes of the respective communication paths for the virtually proximate devices. The virtualized bridge device may be configured to detect data packets transmitted via one of the linked nodes. For example, the virtualized bridge device may identify that data packets, received from a first virtually proximate device, are addressed to a second virtually proximate device. The virtualized bridge device may automatically redirect the data packets to reach the second virtually proximate device via the virtual connection. In some embodiments, the control circuitry 331 generates a virtual network and relevant information (e.g., network addresses, etc.) that includes the virtually proximate devices and any devices externally connected to one or more of the virtually proximate devices.

Once a connection between devices is established (e.g., a local direct or virtual connection), the control circuitry may generate a virtual representation of the media device (e.g., an interactive XR object) for presenting in the VE at block 620. At block 622, the control circuitry may receive an interaction with the virtual representation, for example, that causes the virtual media device to present various content items. At block 624, the control circuitry may provide the media content to one or more physical devices via the established connection such as the external connection or the virtual connection. For example, a first user device 322 may be externally connected to a home speaker system playing music content. A second user device 323 may be externally connected to a smart hub system including audio output devices. The control circuitry 331 may have established a virtual connection between the device 322 and the device 323 for providing the music content to the smart hub system. The control circuitry 331 may cause the smart hub system to play the music content by directing a stream of the music content from the home speaker system to the smart hub system via the virtual connection. The control circuitry 331 may transmit an instruction for the smart hub system to play the content stream.

At block 626, the control circuitry may provide media content via the virtual representation of the media device (e.g., an interactive XR object such as the virtualized media device) in the VE. Continuing the prior example, the control circuitry 331 may have generated a virtual audio renderer in the VE that corresponds to the home speaker system. The control circuitry 331, via the virtual connection, may receive a stream of the music content and play the music content in the VE through the virtual audio renderer. Process 600 may cycle between blocks 624 and 626 via feedback 628 between a physical media device and a virtual media device. For example, the feedback 628 may include a voice input at the physical media device that modifies the presented media content. The control circuitry, based on the feedback 628, may modify the media content at the virtual media device to synchronize the presentation of the media content in the physical environment and the virtual environment.

Figure 7:
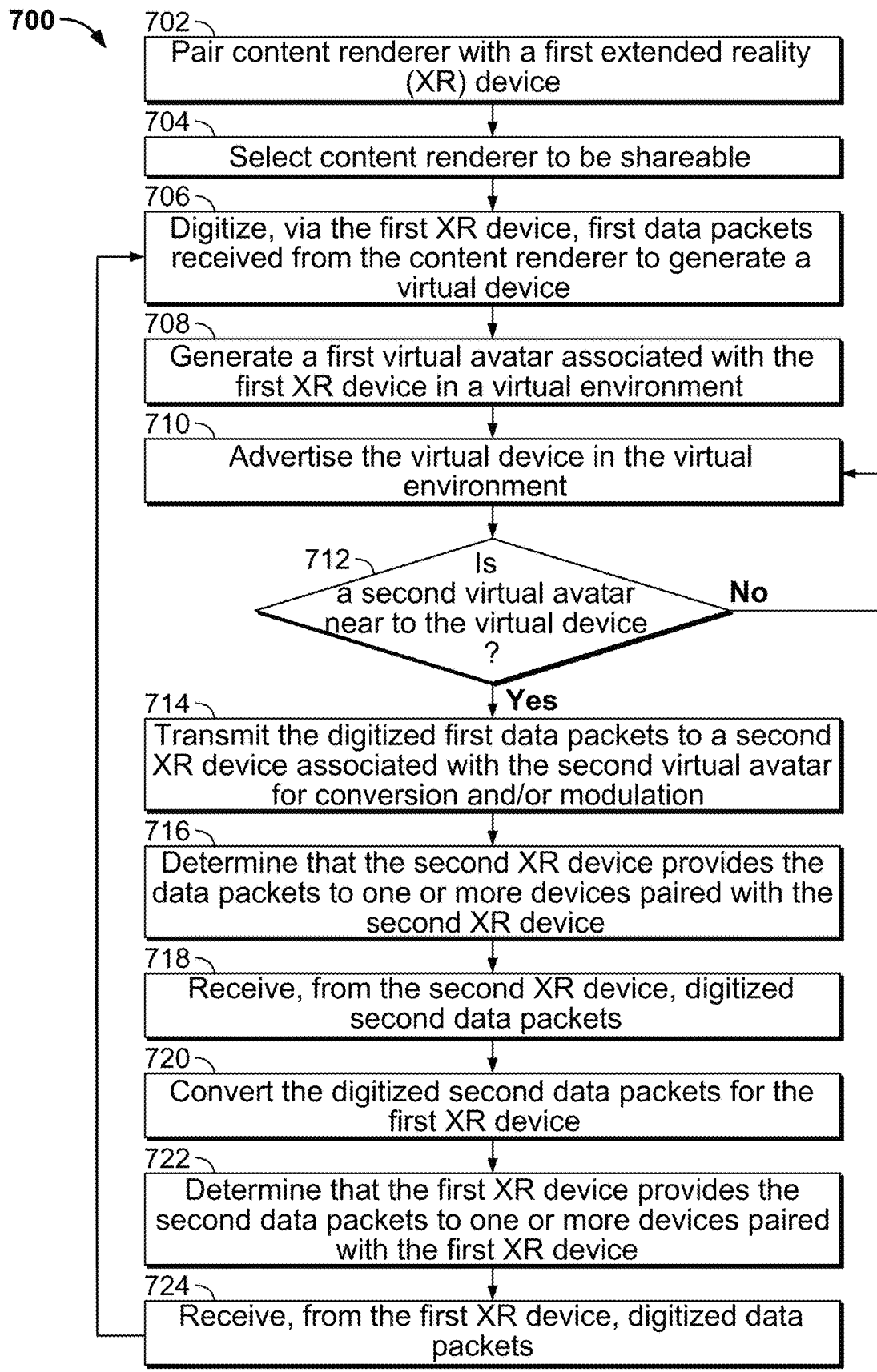
FIG. 7 is a flowchart of an example process for establishing a virtual connection between virtually proximate devices, in accordance with some embodiments of this disclosure.

FIG. 7 is a flowchart of an example process 700 for establishing a virtual connection between virtually proximate devices, in accordance with some embodiments of this disclosure. In various embodiments, process 700 may be executed via one or more components associated with an XR framework. For example, the process 700 may be implemented, in whole or in part, by the systems 300, 400 at FIGS. 3-4. Control circuitry associated with an XR framework may perform some or all of the steps described regarding the process 700. For illustrative purposes, reference is made to control circuitry 331 in the following paragraphs. It is contemplated that capable components at any of the systems and/or devices described herein, and combinations thereof, may perform the actions of the process 700.

At block 702, a content renderer is paired with a first XR device (e.g., equipment 400). At block 704, the content renderer is selected to be shareable, for example, via the first XR device. The first XR device may receive first data packets from the content renderer. At block 706, the first data packets are converted to a suitable format for a virtualized content renderer, or virtual device, in a VE. For example, the first XR device may receive the first data packets and device information about the content renderer. The control circuitry 331 may generate a virtual device based on the device information. The first XR device may generate virtualized data packets by demodulating the first data packets. The virtualized data packets may be transmitted to the control circuitry 331 and, in particular, to the virtual device in the VE. In some embodiments, the control circuitry 331 may receive the first data packets and generate the virtualized data packets for the virtual device.

At block 708, the control circuitry 331 may generate a first virtual avatar associated with the first XR device. The first virtual avatar is presented in the VE. At block 710, the control circuitry 331 may advertise the virtual device in the VE. For example, the control circuitry 331 may broadcast that the content renderer is shareable using the first virtual avatar as a transceiver in the VE. For example, the control circuitry 331 may modify a part of the virtual device as a transceiver for advertising the virtual device in the VE. At block 712, the control circuitry 331 may determine if a second virtual avatar is near to the virtual device. If a second virtual avatar is not nearby ("No" at 712), the control circuitry 331 may continue advertising at block 710. For example, the control circuitry 331 may determine that no virtual avatar is within a proximity threshold of the virtual broadcast source in the VE.

In some embodiments, the XR framework may determine a broadcast range based on a connectivity parameter for the content renderer. For example, the control circuitry may determine that the device information for the content renderer indicates a reliable connectivity range parameter of 40 feet and adjusts the broadcast range in the VE to be detectable to virtual avatars/devices within a 40-foot radius, or its analogue in the VE, from the first virtual avatar and/or the virtual device. In some embodiments, the XR framework may determine a broadcast range based on a VE parameter. For example, in a metaverse-based application, a broadcast range of a virtual device may extend up to the bounds of a virtual space (e.g., a virtual convention or other event venue, video conferencing space, a breakout room, etc.). In some advantageous aspects, determining a broadcast range of a first virtual device based on parameters of a first virtual space of the VE may prevent unauthorized access or interference from a second virtual space with the first virtual device and its corresponding physical device.

If there is a second virtual avatar nearby ("Yes" at 712), the control circuitry 331 transmits the virtualized data packets to the second XR device associated with the second avatar at block 714. The control circuitry 331 generates a virtual connection for transmitting the virtualized data packets. In some embodiments, the control circuitry 331 generates readable data packets for the second XR device by modulating the virtualized data packets. In some embodiments, the second XR device may convert the virtualized data packets to a suitable format for the second XR device. At block 716, the control circuitry 331 may determine that the second XR device provides the converted data packets to one or more externally linked devices. In some instances, the second XR device may generate data packets in a readable format for the externally linked devices.

The second XR device may receive data packets from the externally linked devices (second data packets henceforth). For example, an externally linked device may receive a selection of a play option (e.g., a pause command). In response, the externally linked device may generate virtualized data packets for the second XR device. At block 718, the second XR device receives the virtualized data packets. At block 720, the second XR device may convert the virtualized data packets into a readable format for the first XR device. The second XR device transmits the converted data packets to the first XR device via the virtual connection. At block 722, the first XR device receives the data packets from the second XR device and transmits the data packets to the content renderer. For example, the selected play option is provided to the content renderer. The content renderer may modify presentation of the content (e.g., pausing the presentation). The content renderer may generate a success message and content synchronization data (e.g., the paused frame, a content signature, etc.). The content renderer may transmit the success message and content synchronization data to the first XR device, for example, as feedback data. At block 724, the control circuitry 331 may receive, from the first XR device, the data packets (e.g., the feedback data from the content renderer). Process 700 may return to block 706 based on the received data packets (e.g., to generate an updated virtual device based on the content synchronization data).

Figure 8:
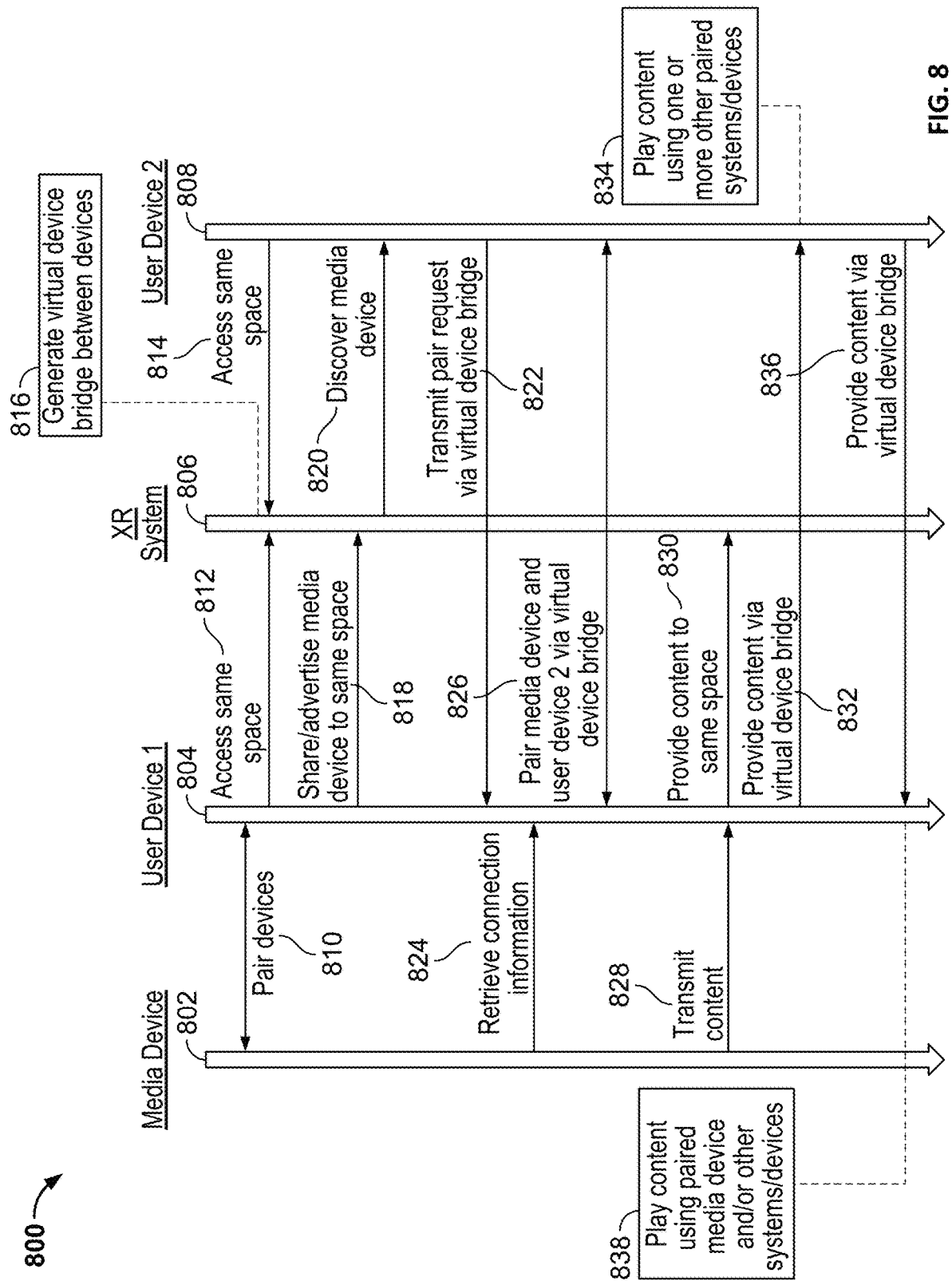
FIG. 8 is a flowchart of a detailed illustrative process for connecting virtually proximate devices and sharing content between the devices, in accordance with some embodiments of this disclosure.

FIG. 8 is a flowchart of a detailed illustrative process 800 for connecting virtually proximate devices and sharing content between the devices, in accordance with some embodiments of this disclosure. In various embodiments, process 800 may be executed via one or more components associated with an XR framework. For example, the process 800 may be implemented, in whole or in part, by the systems 300, 400 at FIGS. 3-4. In some aspects, the process 800 illustrates an example data flow between media device 802, a first user device 804, an XR system 806, and a second user device 808, e.g., as described regarding the process 500.

At 810, the device 802 and the device 804 are linked via pairing or any other external connection. At 812-814, the device 804 and the device 808 access the same virtual space of the XR system 806. At 816, based on accessing the same virtual space, the XR system 806 generates a virtual device bridge between the devices 804 and 808. In this example, the devices 804 and 808 may be communicatively coupled by the virtual device bridge, forming a communication path between nodes of the XR system 806 and bypassing a central server of the XR system 806. The XR system 806 may dynamically adjust the virtual device bridge, for example, by selecting the nodes as part of the communication path to maintain a stable data transmission rate between the devices 804 and 808. At 818, the device 804 may indicate to the virtual space of the XR system 806 that the device 802 is shareable (e.g., in a discoverable mode). The XR system 806 may receive information about the device 802 for advertising in the virtual space. At 820, the XR system 806 may transmit the information about the device 802 to the device 808. In this manner, the device 808 may detect that the device 802 is available. For example, the device 802 may be listed in a UI presented at the device 808 as a discoverable virtual device. At 822, the device 808 transmits, via the virtual device bridge, a request to the device 804 for connecting to the device 802.

At 824, the device 804 may retrieve connection information from the device 802, for example, in response to the connection request from the device 808. At 826, the device 804 and the device 808 exchange the connection information via the virtual device bridge. For example, the devices 802 and 808 may be paired via the virtual device bridge in an analogous manner as the pairing between the devices 802 and 804. At 828, the device 802 may transmit a content item (e.g., including video, audio, etc.) to the device 804. At 830, the device 804 may provide the content item to the virtual space of the XR system 806. For example, the XR system 806 may generate a virtual device that presents the content item in the virtual space. At 832, the device 804 may provide the content item to the device 808 via the virtual device bridge. In some embodiments, at 834, the device 808 may transmit and/or play the content item using one or more externally linked devices. Additionally, or alternatively, at 836, the device 808 may provide content such as a second content item (e.g., from an externally linked device) to the device 804 via the virtual device bridge. At 838, the device 804 may play the content (e.g., the second content item) using the device 802 or another externally connected device.

In various embodiments, the individual steps of processes 500-800 may be implemented by one or more components of the devices and systems described with respect to FIGS. 1-4. For example, the processes 500-800 may be implemented, in whole or in part, by the one or more components of systems 100-400. While certain steps of the processes 500-800 and other processes are described herein as being implemented by certain components and/or devices, it is noted that this is for illustrative purposes, and it is understood that other suitable device and/or system components may be substituted without departing from the teachings of the present disclosure.

The systems and processes described herein are intended to be illustrative and not limiting. One skilled in the art would appreciate that the system components and/or steps of the processes discussed herein may be suitably substituted, omitted, modified, combined and/or rearranged. Components and/or steps may be added without departing from the scope of the present disclosure. More generally, the above disclosure is meant to be illustrative and not limiting. Only the claims that follow are meant to set bounds as to what the present disclosure includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for sharing media content between virtually proximate devices via a virtual environment, the method comprising:
    determining that a first user device is connected to a same space in the virtual environment, wherein the first user device is externally connected with a media device;
    determining that a second user device is connected to the same space in the virtual environment;
    retrieving device information corresponding to the media device;
    generating, based on the device information, a virtual representation of the media device in the same space;
    receiving a selection of the virtual representation of the media device;
    identifying a communication path between the first user device and the second user device based on respective connections of the first user device and the second user device to the same space; and
    generating, based on identifying the communication path between the first user device and the second user device, a virtual connection for providing the media content between the media device, the first user device, and the second user device.

2. The method of claim 1, wherein the first user device is paired with the media device, and wherein the media device is in a sharing mode.

3. The method of claim 1, wherein generating the virtual connection comprises generating a virtual bridge for joining the communication path between the first user device and the second user device.

4. The method of claim 3, wherein generating the virtual connection comprises generating a virtual proxy device at the first user device, wherein the virtual proxy device is configured to transmit the media content from the media device to the second user device using the virtual connection.

5. The method of claim 3, wherein a plurality of user devices is connected to the same space, the method further comprising generating a plurality of virtual connections corresponding to the plurality of user devices, each virtual connection of the plurality of virtual connections forming a communication path between the media device and a respective user device.

6. The method of claim 1, further comprising generating, for display at the second user device, a user interface (UI) for connecting to the media device via the virtual connection.

7. The method of claim 6, wherein the UI comprises a virtual display presented in the same space.

8. The method of claim 1, further comprising:
    generating a first virtual representation associated with the first user device in the same space; and
    generating a second virtual representation associated with the second user device in the same space.

9. The method of claim 8, wherein the first virtual representation is a first virtual avatar associated with the first user device, and wherein the second virtual representation is a second virtual avatar associated with the second user device, the method further comprising generating for display the first virtual avatar and the second virtual avatar in the same space.

10. The method of claim 9, further comprising exchanging protocol data between the first virtual avatar and the second virtual avatar for initiating communication in the virtual environment.

11. A system for sharing media content between virtually proximate devices via a virtual environment comprising:
    communication circuitry configured to transmit and receive data for a virtual environment; and
    control circuitry configured to:
        determine that a first user device is connected to a same space in the virtual environment, wherein the first user device is externally connected with a media device;
        determine that a second user device is connected to the same space in the virtual environment;
        retrieve device information corresponding to the media device;
        generate, based on the device information, a virtual representation of the media device in the same space;

receive a selection of the virtual representation of the media device;

identify a communication path between the first user device and the second user device based on respective connections of the first user device and the second user device to the same space; and generate, based on identifying the communication path between the first user device and the second user device, a virtual connection for providing the media content between the media device, the first user device, and the second user device.

12. The system of claim 11, wherein the first user device is paired with the media device, and the media device is in a sharing mode.

13. The system of claim 11, wherein the control circuitry, when generating the virtual connection, is configured to generate a virtual bridge for joining the communication path between the first user device and the second user device.

14. The system of claim 13, wherein the control circuitry, when generating the virtual connection, is configured to generate a virtual proxy device at the first user device, wherein the virtual proxy device is configured to transmit the media content from the media device to the second user device using the virtual connection.

15. The system of claim 13, wherein a plurality of user devices is connected to the same space, and wherein the control circuitry is further configured to generate a plurality of virtual connections corresponding to the plurality of user devices, each virtual connection of the plurality of virtual connections forming a communication path between the media device and a respective user device.

16. The system of claim 11, wherein the control circuitry is further configured to:

generate, for display at the second user device, a user interface (UI) for connecting to the media device via the virtual connection.

17. The system of claim 16, wherein the UI comprises a virtual display presented in the same space.

18. The system of claim 11, wherein the control circuitry is further configured to:

generate a first virtual representation associated with the first user device in the same space; and generate a second virtual representation associated with the second user device in the same space.

19. The system of claim 18, wherein the first virtual representation is a first virtual avatar associated with the first user device, and the second virtual representation is a second virtual avatar associated with the second user device, and wherein the control circuitry is further configured to generate for display the first virtual avatar and the second virtual avatar in the same space.

20. The system of claim 19, wherein the control circuitry is further configured to:

exchange protocol data between the first virtual avatar and the second virtual avatar for initiating communication in the virtual environment.

\* \* \* \* \*